United States Patent
Akimoto

(10) Patent No.: US 9,602,768 B2
(45) Date of Patent: Mar. 21, 2017

(54) APPARATUS, SYSTEM, AND METHOD OF MANAGING TERMINALS, AND RECORDING MEDIUM

(71) Applicant: Yuya Akimoto, Tokyo (JP)

(72) Inventor: Yuya Akimoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/552,753

(22) Filed: Nov. 25, 2014

(65) Prior Publication Data

US 2015/0145947 A1  May 28, 2015

(30) Foreign Application Priority Data

Nov. 28, 2013  (JP) ................................ 2013-245936

(51) Int. Cl.
*H04N 7/15* (2006.01)
*H04L 29/06* (2006.01)
*H04M 3/56* (2006.01)

(52) U.S. Cl.
CPC .............. *H04N 7/15* (2013.01); *H04L 65/403* (2013.01); *H04M 3/567* (2013.01)

(58) Field of Classification Search
CPC ......... H04L 29/12047; H04L 29/12122; H04L 29/12132; H04L 29/1215; H04L 29/12169;
(Continued)

(56) References Cited

U.S. PATENT DOCUMENTS

| 8,437,746 B1 * | 5/2013 | Breau ................. H04M 7/0075 455/412.2 |
| 2002/0169855 A1 * | 11/2002 | Maehiro ................. H04L 12/58 709/219 |

(Continued)

FOREIGN PATENT DOCUMENTS

JP  2013-085208  5/2013

OTHER PUBLICATIONS

U.S. Appl. No. 14/469,932, filed Aug. 27, 2014.

*Primary Examiner* — Stella Woo
(74) *Attorney, Agent, or Firm* — Oblon, McClelland, Maier & Neustadt, L.L.P.

(57) ABSTRACT

A management system manages a candidate list for each one of a plurality of transmission terminals, the candidate list associating identification information of one or more candidate counterpart terminals each capable of communicating with the transmission terminal, with identification information of the transmission terminal. In response to receiving a deletion request for deleting identification information of a second transmission terminal of the plurality of transmission terminals from the candidate list of a first transmission terminal of the plurality of transmission terminals, the management system deletes the identification information of the second transmission terminal from the candidate list of the first transmission terminal, and further deletes identification information of the first transmission terminal from a candidate list of the second transmission terminal; and transmits, to the second transmission terminal, notification indicating deletion of the identification information of the first transmission terminal from the candidate list of the second transmission terminal.

17 Claims, 25 Drawing Sheets

(58) Field of Classification Search
CPC ............. H04L 61/1547; H04L 61/1552; H04L 61/1564; H04L 61/1576; H04L 61/1594; H04M 7/0075; H04M 3/42382
See application file for complete search history.

(56) References Cited

U.S. PATENT DOCUMENTS

| | | | |
|---|---|---|---|
| 2004/0128151 A1* | 7/2004 | Mock | G06Q 10/10 709/204 |
| 2009/0024633 A1* | 1/2009 | Swanburg | H04L 29/12047 |
| 2010/0158226 A1* | 6/2010 | Arsenault | G06F 17/30289 379/142.15 |
| 2011/0310886 A1* | 12/2011 | Chaturvedi | H04L 63/08 370/352 |
| 2013/0031189 A1* | 1/2013 | Lam | G06Q 10/107 709/206 |
| 2013/0223292 A1 | 8/2013 | Okuyama et al. | |
| 2014/0024430 A1* | 1/2014 | Wisler | G07F 17/323 463/20 |
| 2015/0127678 A1* | 5/2015 | Zhou | G06F 17/30589 707/770 |

* cited by examiner

FIG. 8

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 9

TERMINAL MANAGEMENT TABLE

| TERMINAL ID | TERMINAL NAME | OPERATION STATE | DATE/TIME RECEIVED | IP ADDRESS |
|---|---|---|---|---|
| 01aa | AA TERMINAL, TOKYO OFFICE, JAPAN | ONLINE (COMMUNICATION OK) | 2009.11.10.13:40 | 1.2.1.3 |
| 01ab | AB TERMINAL, TOKYO OFFICE, JAPAN | ONLINE (COMMUNICATION OK) | 2009.11.09.12:00 | 1.2.1.4 |
| ... | ... | ... | ... | ... |
| 01ba | BA TERMINAL, OSAKA OFFICE, JAPAN | ONLINE (INTERRUPT) | 2009.11.10.13:45 | 1.2.2.3 |
| 01bb | BB TERMINAL, OSAKA OFFICE, JAPAN | ONLINE (COMMUNICATION OK) | 2009.11.10.13:50 | 1.2.2.4 |
| ... | ... | ... | ... | ... |
| 01ca | CA TERMINAL, NEW YORK OFFICE, U.S. | OFFLINE | 2009.11.10.12:45 | 1.3.1.3 |
| 01cb | CB TERMINAL, NEW YORK OFFICE, U.S. | ONLINE (COMMUNICATING) | 2009.11.10.13:55 | 1.3.1.4 |
| ... | ... | ... | ... | ... |
| 01da | DA TERMINAL, WASHINGTON D.C. OFFICE, U.S. | ONLINE (COMMUNICATING) | 2009.11.08.12:45 | 1.3.2.3 |
| 01db | DB TERMINAL, WASHINGTON D.C. OFFICE, U.S. | ONLINE (COMMUNICATION OK) | 2009.11.10.12:45 | 1.3.2.4 |
| ... | ... | ... | ... | ... |

FIG. 10

CANDIDATE LIST MANAGEMENT TABLE

| REQUEST SENDER TERMINAL ID | COUNTERPART TERMINAL ID |
|---|---|
| 01aa | 01ab,⋯,01ba,01bb,⋯,01ca,01cb,01da,01db,01dc |
| 01ab | 01aa,01ca,01cb |
| 01ba | 01aa,01ab,01ca,01cb,20da,01db |
| ... | ... |
| 01db | 01aa,01ab,01ba,⋯,01da,01ca,01cb,⋯01da |

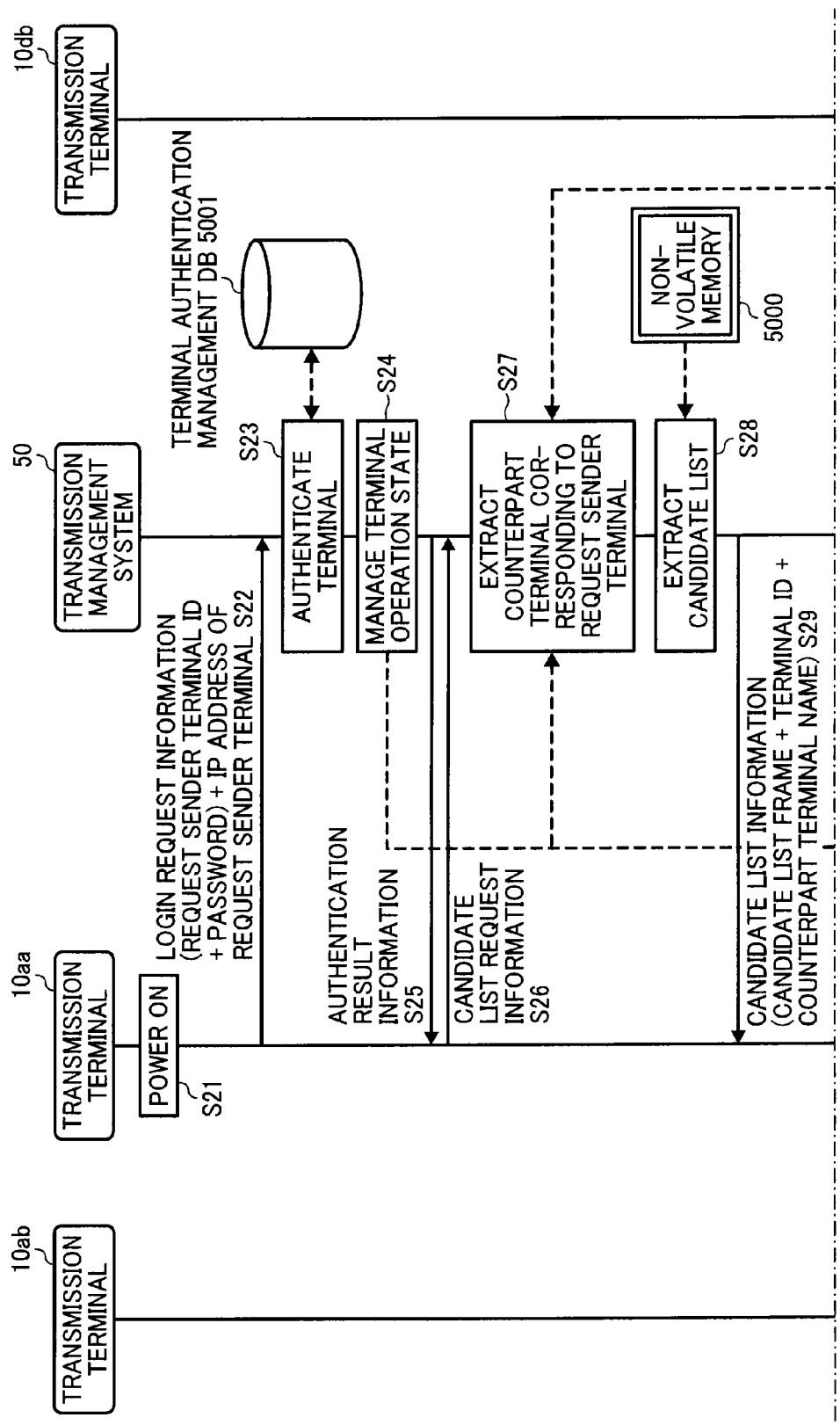

| TERMINAL NAME | TERMINAL ID | OPERATION |
|---|---|---|
| AB TERMINAL, TOKYO OFFICE, JAPAN | 01ab | EDIT |
| AC TERMINAL, TOKYO OFFICE, JAPAN | 01ac | EDIT |
| AD TERMINAL, TOKYO OFFICE, JAPAN | 01ad | EDIT |
| DC TERMINAL, WASH, D.C. OFFICE, U.S. | 01dc | EDIT |

DELETE COUNTERPART TERMINAL

APPARATUS, SYSTEM, AND METHOD OF MANAGING TERMINALS, AND RECORDING MEDIUM

CROSS-REFERENCE TO RELATED APPLICATIONS

This patent application is based on and claims priority pursuant to 35 U.S.C. §119(a) to Japanese Patent Application No. 2013-245936, filed on Nov. 28, 2013, in the Japan Patent Office, the entire disclosure of which is hereby incorporated by reference herein.

BACKGROUND

Technical Field

The present invention relates to managing information regarding a plurality of transmission terminals.

Description of the Related Art

Transmission systems that perform a teleconference or the like via a communication network such as the Internet have become popular in recent years due to a demand for reducing business trip costs and time. In such a transmission system, once communication between a plurality of transmission terminals starts, image data and audio data are transmitted and received, thereby realizing a videoconference.

In order to make it easier for a user to select a desired counterpart terminal from among candidate counterpart terminals for communication, the transmission system may display a candidate list on a request sender terminal that is the sender of a communication request to allow the user to select a desired counterpart terminal. For example, a management server may be provided, which manages a candidate list for each terminal connected via a communication network.

SUMMARY

Example embodiments of the present invention include an apparatus, system, and method of managing a plurality of transmission terminals, and a control program stored in a non-transitory recording medium. The management system manages a candidate list for each one of the plurality of transmission terminals, the candidate list associating identification information of one or more candidate counterpart terminals each capable of communicating with the transmission terminal, with identification information of the transmission terminal. In response to receiving a deletion request for deleting identification information of a second transmission terminal of the plurality of transmission terminals from the candidate list of a first transmission terminal of the plurality of transmission terminals, the management system deletes the identification information of the second transmission terminal from the candidate list of the first transmission terminal, and further deletes identification information of the first transmission terminal from a candidate list of the second transmission terminal; and transmits, to the second transmission terminal, notification indicating deletion of the identification information of the first transmission terminal from the candidate list of the second transmission terminal.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a conceptual diagram illustrating an example terminal authentication management table;

FIG. 9 is a conceptual diagram illustrating an example terminal management table;

FIG. 10 is a conceptual diagram illustrating an example candidate list management table;

FIGS. 11A and 11B are a data sequence diagram illustrating operation of preparing for starting communication between transmission terminals, performed by the transmission system of FIG. 1;

FIG. 12 is a conceptual diagram illustrating an example candidate list;

FIG. 20 is a conceptual diagram illustrating an example candidate list;

Figure 1:
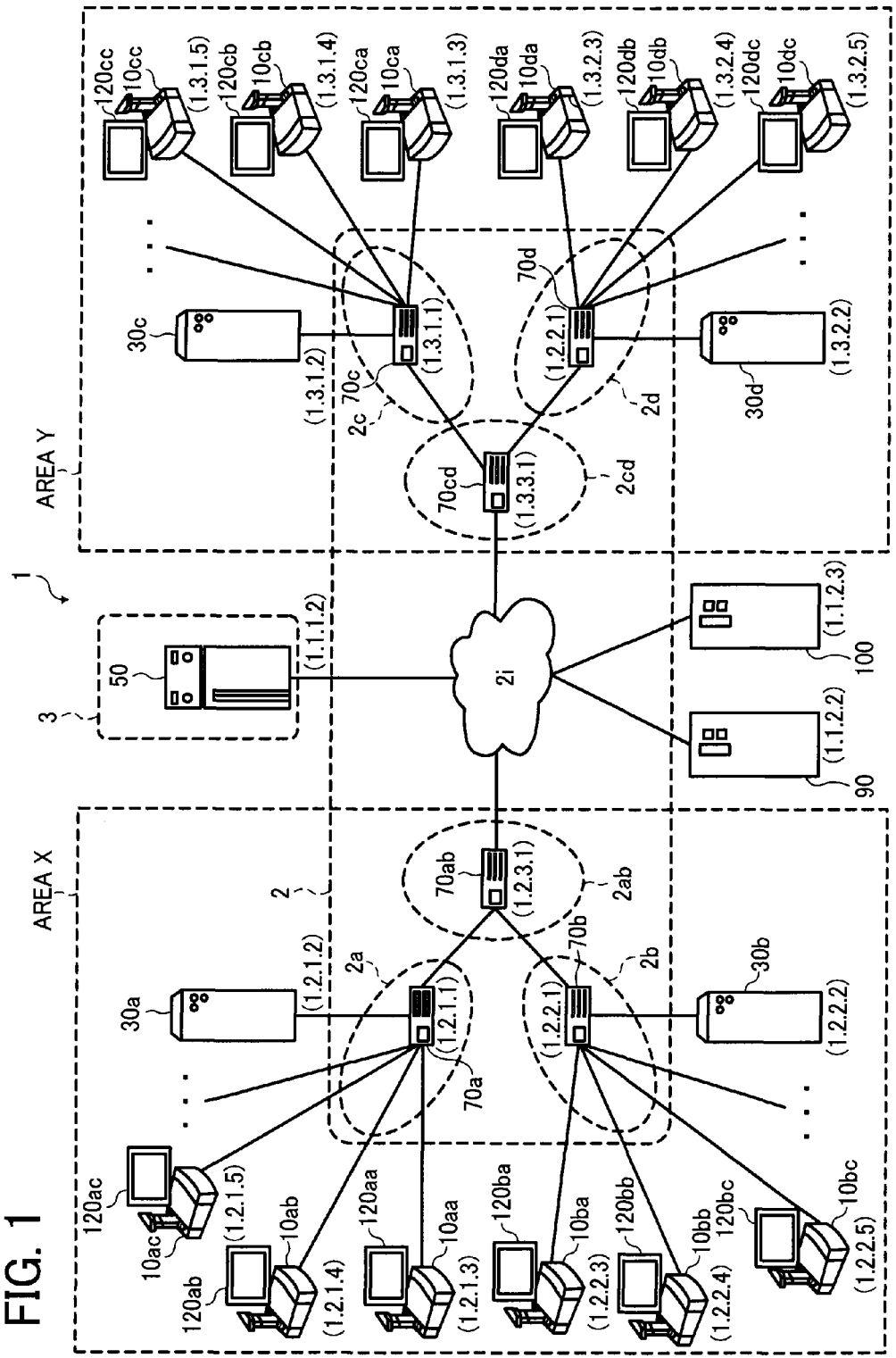
FIG. 1 is a schematic diagram of a transmission system according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Hereinafter, embodiments of the present invention will be described using the drawings.

First, referring to FIGS. 1 to 15, a transmission system 1 is explained according to an embodiment of the present invention.

<<Overall Configuration of Embodiment>>

Figure 2:
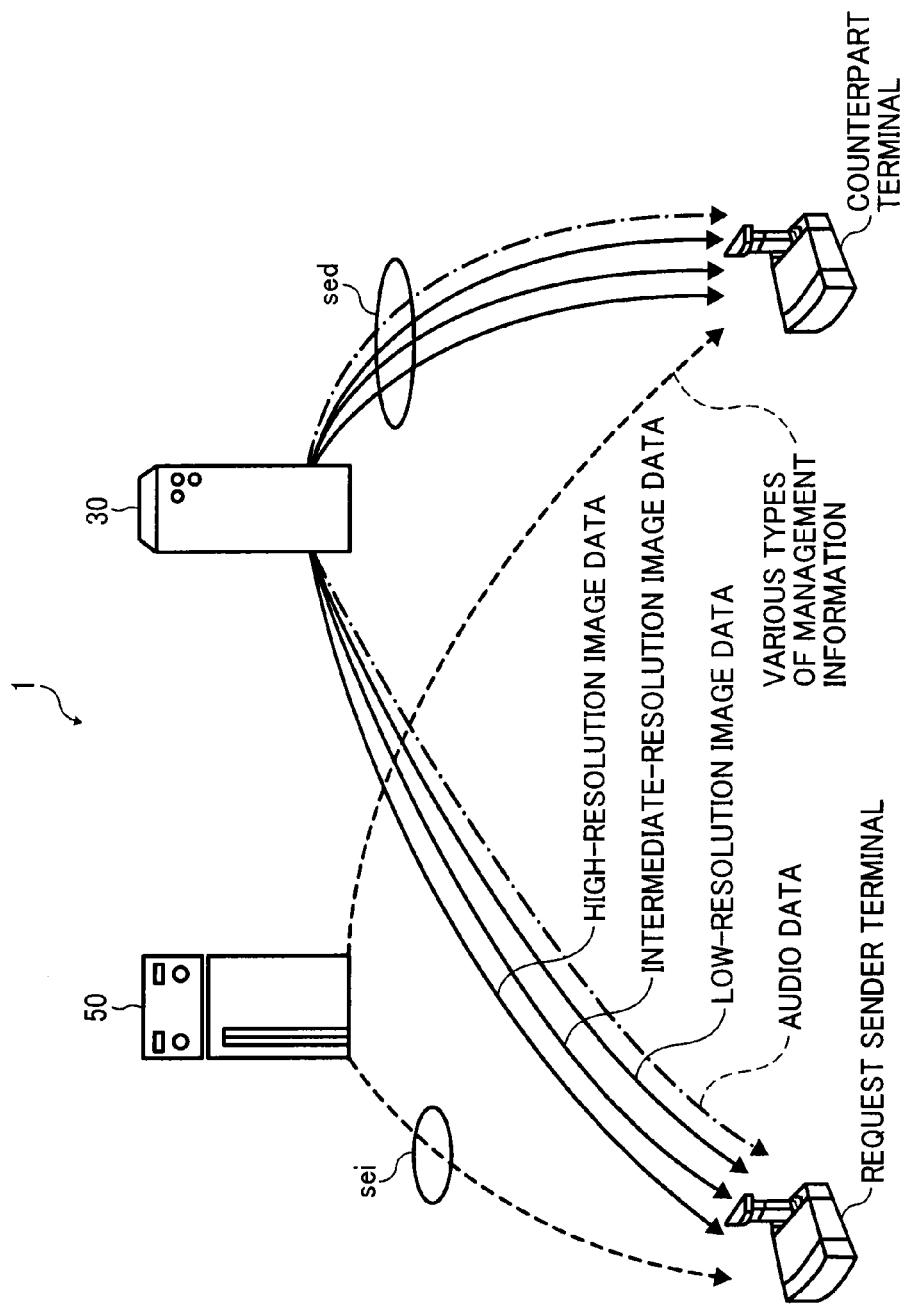
FIG. 2 is a conceptual diagram illustrating a transmission/reception state of image data, audio data, and various types of information in the transmission system of FIG. 1.
Figure 3A:
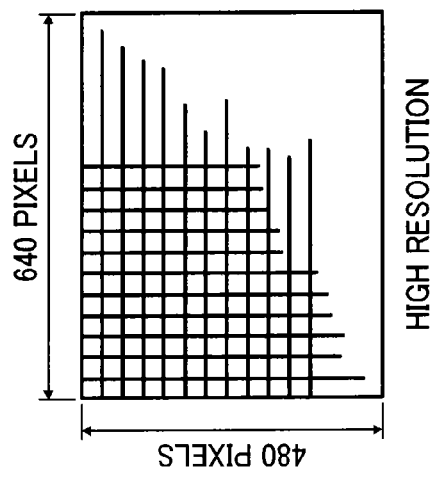
FIGS. 3A to 3C are conceptual diagrams describing the image quality of image data.
Figure 3B:
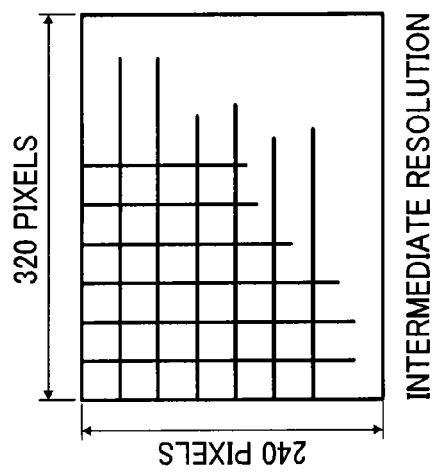
Figure 3C:
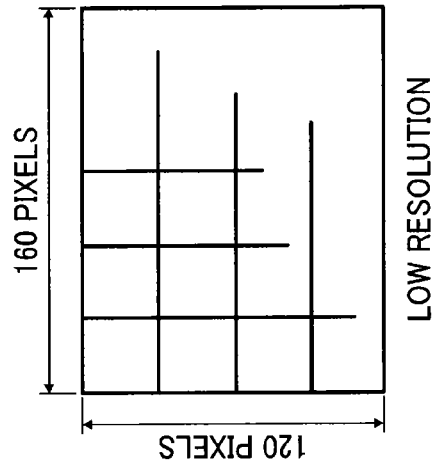

FIG. 1 is a schematic diagram of a transmission system 1 according to an embodiment of the present invention. FIG. 2 is a conceptual diagram illustrating a transmission/reception state of image data, audio data, and various types of information in the transmission system 1. FIGS. 3A to 3C are conceptual diagrams describing the image quality of image data, to be transmitted or received in the transmission system 1.

The transmission system 1 is one example of a communication system that intercommunicates information, information that reflects feelings, or the like between a plurality of transmission terminals 10 via a transmission management system 50. The communication system is a system for intercommunicating information, information that reflects feelings, or the like between a plurality of communication terminals (corresponding to "transmission terminals") via a communication management system (corresponding to a "transmission management system"), and examples thereof include a teleconference system and a videoconference system.

In the embodiment, the transmission system, the transmission management system, and the transmission terminal will be described while assuming a videoconference system serving as an example of the communication system, a videoconference management system serving as an example of the communication management system, and a videoconference terminal serving as an example of the communication terminal. That is, the transmission management system according to the embodiment of the present invention are applied not only to a videoconference system, but also to various other types of communication system.

In addition, the case in which users of the transmission system 1 include four offices, namely, a Tokyo office (user a), an Osaka office (user b), a New York office (user c), and a Washington D.C. office (user d), will be described in the embodiment.

The transmission system 1 illustrated in FIG. 1 includes a plurality transmission terminals (10*aa*, 10*ab*, . . . ), displays (120*aa*, 120*ab*, . . . ) for the corresponding transmission terminals (10*aa*, 10*ab*, . . . ), a plurality of relay devices (30*a*, 30*b*, 30*c*, and 30*d*), the transmission management system 50, a program providing system 90, and a maintenance system 100. Note that a management system 3 is configured by the transmission management system 50 in the embodiment.

The plurality of transmission terminals 10 each transmit or receive image data and audio data serving as examples of content data.

Hereinafter, the "transmission terminal" may simply be represented as the "terminal". In addition, an arbitrary one or ones of the plurality of terminals (10*aa*, 10*ab*, . . . ) is/are represented as a "terminal(s) 10". An arbitrary one or ones of the plurality of displays (120*aa*, 120*ab*, . . . ) is/are represented as a "display(s) 120". An arbitrary one or ones of the plurality of relay devices (30*a*, 30*b*, 30*c*, and 30*d*) is/are represented as a "relay device(s) 30". Further, a terminal serving as a request sender terminal that gives a request to start a teleconference is represented as a "request sender terminal", and a terminal serving as a counterpart terminal that is a request destination (relay destination) is represented as a "counterpart terminal".

As illustrated in FIG. 2, a management information session sei for transmitting and receiving various types of management information is established via the transmission management system 50 between a request sender terminal and a counterpart terminal in the transmission system 1. In addition, four sessions for transmitting and receiving four items of data, namely, high-resolution image data, intermediate-resolution image data, low-resolution image data, and audio data, are established via a relay device 30 between the request sender terminal and the counterpart terminal. Here, these four sessions are collectively indicated as an image/audio data session sed.

Here, the resolution of images of image data handled in the embodiment will be described. There are the following images: a low-resolution image, serving as a base image, having horizontal 160 pixels by vertical 120 pixels, as illustrated in FIG. 3A; an intermediate-resolution image having horizontal 320 pixels by vertical 240 pixels, as illustrated in FIG. 3B; and a high-resolution image having horizontal 640 pixels by vertical 480 pixels, as illustrated in FIG. 3C. In the case of transmitting via a narrowband path, low-quality image data that only includes low-resolution image data serving as a base image is relayed. In the case of a relatively wide band, intermediate-quality image data including low-resolution image data serving as a base image and intermediate-resolution image data is relayed. In the case of a very wide band, high-quality image data including low-resolution image data serving as a base image, intermediate-resolution image data, and high-resolution image data is relayed.

The relay devices 30 illustrated in FIG. 1 relay content data between the plurality of terminals 10. The transmission management system 50 collectively manages login authentication from the terminals 10, the communication states, candidate lists, and so forth of the terminals 10, and the communication states and so forth of the relay devices 30. Note that an image of image data may be a moving image or a still image, or may include both thereof.

A plurality of routers (70*a*, 70*b*, 70*c*, 70*d*, 70*ab*, and 70*cd*) select an optimal path for image data and audio data. Hereinafter, an arbitrary one or ones of the routers (70*a*, 70*b*, 70*c*, 70*d*, 70*ab*, and 70*cd*) is/are represented as a "router(s) 70".

The program providing system 90 includes a hard disk (HD) 204 described later. The HD 204 stores a terminal program for causing a terminal 10 to realize various functions (or for causing a terminal 10 to function as various elements), and the terminal program can be transmitted to the terminal 10. In addition, the HD 204 of the program providing system 90 stores a relay device program for causing a relay device 30 to realize various functions (or for causing a relay device 30 to function as various elements), and the relay device program can be transmitted to the relay device 30. Further, the HD 204 of the program providing system 90 stores a transmission management program for causing the transmission management system 50 to realize various functions (or for causing the transmission management system 50 to function as various elements), and the transmission management program can be transmitted to the transmission management system 50.

The maintenance system 100 may be one or more computers for performing maintenance, management, or conservation of at least one of the terminals 10, the relay devices 30, the transmission management system 50, and the program providing system 90. For example, in the case where the maintenance system 100 is located in one country, and the terminals 10, the relay devices 30, the transmission management system 50, or the program providing system 90 is/are located outside that country, the maintenance system 100 remotely performs, via a communication network 2, maintenance, management, or conservation of at least one of the terminals 10, the relay devices 30, the transmission management system 50, and the program providing system 90. In addition, the maintenance system 100 performs maintenance such as management of the modal number, serial number, sales contact, maintenance checkup, or a past history of failures of at least one of the terminals 10, the relay devices 30, the transmission management system 50, and the program providing system 90 without having the communication network 2 therebetween.

The terminals (10*aa*, 10*ab*, 10*ac*, . . . ), the relay device 30*a*, and the router 70*a* are connected to be communicable with each other by a local area network (LAN) 2*a*. The terminals (10*ba*, 10*bb*, 10*bc*, . . . ), the relay device 30*b*, and the router 70*b* are connected to be communicable with each other by a LAN 2*b*. In addition, the LAN 2*a* and the LAN 2*b* are connected to be communicable with each other by a dedicated line 2*ab* including the router 70*ab* and are configured in a certain area A. For example, assuming that the area A is Japan, the LAN 2*a* is configured in the office in Tokyo, and the LAN 2*b* is configured in the office in Osaka.

The terminals (10*ca*, 10*cb*, 10*cc*, . . . ), the relay device 30*c*, and the router 70*c* are connected to be communicable with each other by a LAN 2*c*. The terminals (10*da*, 10*db*, 10*dc*, . . . ), the relay device 30*d*, and the router 70*d* are connected to be communicable with each other by a LAN 2*d*. In addition, the LAN 2*c* and the LAN 2*d* are connected to be communicable with each other by a dedicated line 2*cd* including the router 70*cd* and are configured in a certain area B. For example, assuming that the area B is the United States, the LAN 2*c* is configured in the office in New York, and the LAN 2*d* is configured in the office in Washington D.C. The devices in the area A and the devices in the area B are connected to be communicable with each other via the routers (70*ab* and 70*cd*), respectively, via the Internet 2*i*.

In addition, the transmission management system 50 and the program providing system 90 are connected to be communicable with the terminals 10 and the relay devices 30 via the Internet 2*i*. The transmission management system 50 and the program providing system 90 may be located in the area A or the area B, or may be located in other areas.

In the embodiment, the communication network 2 of the embodiment includes the LAN 2*a*, the LAN 2*b*, the dedicated line 2*ab*, the Internet 2*i*, the dedicated line 2*cd*, the LAN 2*c*, and the LAN 2*d*. The communication network 2 may include not only a wired network, but also a network where communication is performed wirelessly, such as Wireless Fidelity (WiFi) or Bluetooth (registered trademark).

In addition in FIG. 1, four digits indicated below each of the terminals 10, each of the relay devices 30, the transmission management system 50, each of the routers 70, and the program providing system 90 indicates an IP address in an abbreviated form in the general Internet Protocol version 4 (IPv4). For example, the IP address of the terminal 10*aa* is "1.2.1.3". Although IPv6 may be used instead of IPv4, IPv4 is used in order to make the description simple.

Note that the terminals 10 may be used not only for communication between different offices or for communication between different rooms in the same office, but also for communication within the same room or for outdoor-indoor communication or outdoor-outdoor communication. In the case where the terminals 10 are used outside, wireless communication using a cellular phone communication network or the like is performed.

<<Hardware Configuration>>

Figure 4:
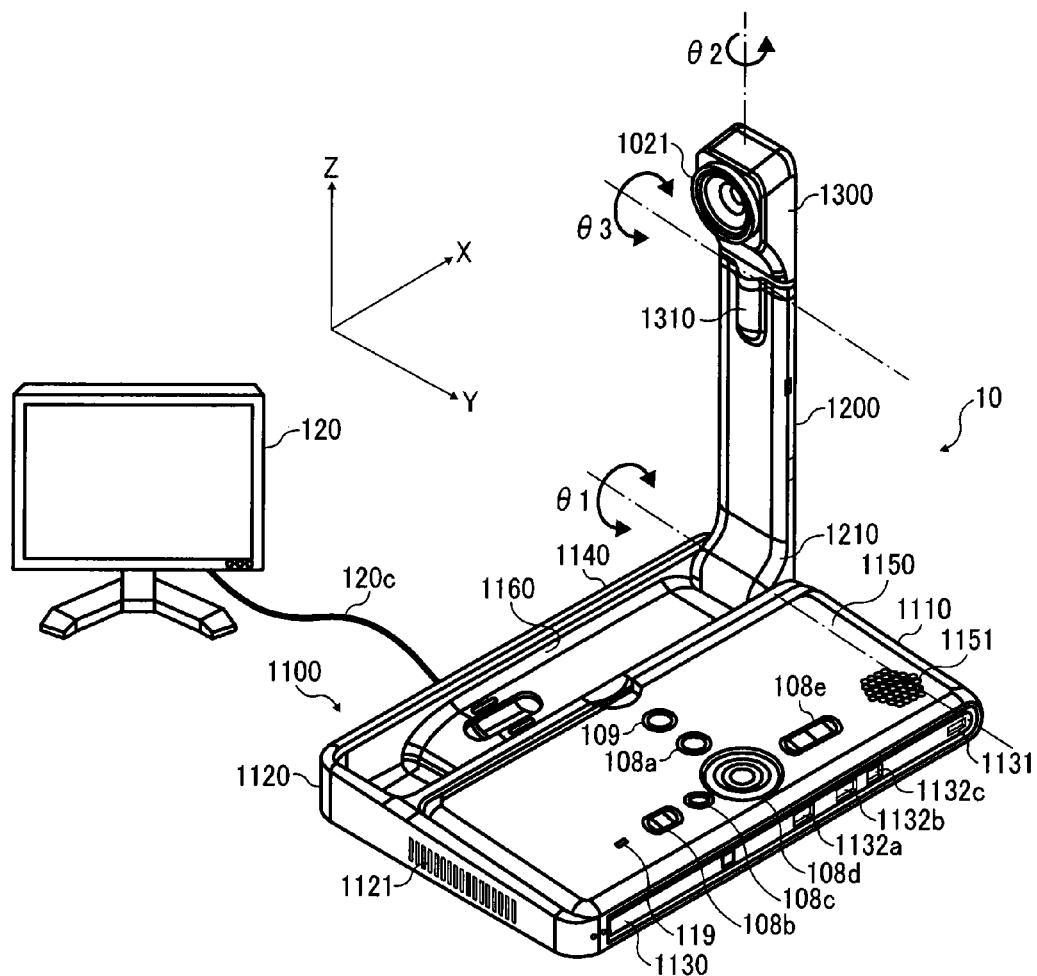
FIG. 4 is an external view of a transmission terminal of the transmission system of FIG. 1.

First, the hardware configuration of the system 1 will be described. FIG. 4 is an external view of a terminal 10 according to the embodiment. The description will be given assuming that the longitudinal direction of the terminal 10 is the X-axis direction, a direction orthogonal to the X-axis direction on one plane is the Y-axis direction, and a direction orthogonal to the X-axis direction and the Y-axis direction (vertical direction) is the Z-axis direction.

As illustrated in FIG. 4, the terminal 10 includes a casing 1100, an arm 1200, and a camera housing 1300. Among these portions, a front wall 1110 of the casing 1100 has an inlet face (not illustrated) including a plurality of inlet holes, and a back wall 1120 of the casing 1100 has an exhaust face 1121 on which a plurality of exhaust holes are formed. Accordingly, by driving of a cooling fan included in the casing 1100, air behind the terminal 10 can be taken in via the inlet face (not illustrated) and exhausted to the rear of the terminal 10 via the exhaust face 1121. A right-side wall 1130 of the casing 1100 has a sound pickup hole 1131 formed thereon, and a built-in microphone 114, described later, is capable of picking up sound and noise.

An operation panel 1150 is formed toward the right-side wall 1130 of the casing 1100. The operation panel 1150 has a plurality of operation keys (108a to 108e) described later, a power switch 109 described later, and an alarm lamp 119 described later, which are formed thereon. In addition, the operation panel 1150 has a sound output face 1151 formed thereon, which is formed of a plurality of audio output holes for allowing output sound from a built-in speaker 115 described later to pass through. In addition, an accommodating portion 1160 serving as a recess for accommodating the arm 1200 and the camera housing 1300 is formed toward a left-side wall 1140 of the casing 1100. A plurality of connection ports (1132a to 1132c) for electrically connecting cables to an external device connection interface (I/F) 118 described later are provided on the right-side wall 1130 of the casing 1100. In contrast, a connection port for electrically connecting a cable 120c for a display 120 to the external device connection I/F 118 described later is provided on the left-side wall 1140 of the casing 1100.

The following description uses the term "operation key(s) 108" for indicating an arbitrary one or ones of the operation keys (108a to 108e), and the term "connection port(s) 1132" for indicating an arbitrary one or ones of the connection ports (1132a to 1132c).

Next, the arm 1200 is attached to the casing 1100 via a torque hinge 1210 and is configured to be rotatable in the vertical direction within the range of a tilt angle θ1 of 135 degrees with respect to the casing 1100. FIG. 4 indicates a state in which the tilt angle θ1 is 90 degrees.

The camera housing 1300 has a built-in camera 112 provided thereon, which will be described later, and the camera 112 can capture an image of a user, a document, a room, or the like. In addition, the camera housing 1300 has a torque hinge 1310 formed thereon. The camera housing 1300 is attached to the arm 1200 via the torque hinge 1310 and is configured to be rotatable in the vertical and horizontal directions within a range of a pan angle θ2 of ±180 degrees and a tilt angle θ3 of ±45 degrees with respect to the state illustrated in FIG. 4 serving as 0 degrees.

Since the relay devices 30, the transmission management system 50, the program providing system 90, and the maintenance system 100 have the same appearance as that of a general server computer, descriptions of the appearances thereof are omitted.

Figure 5:
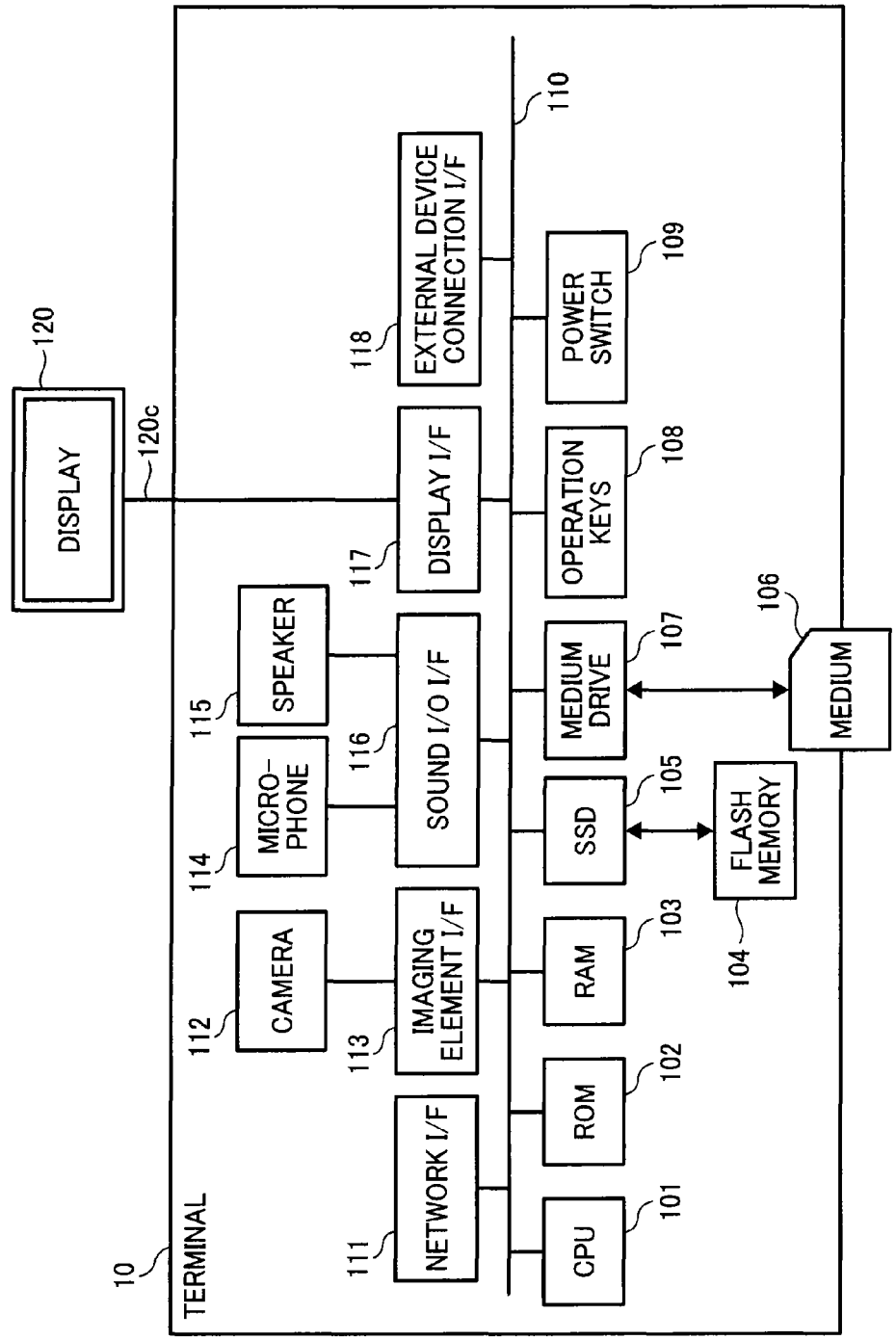
FIG. 5 is a hardware configuration diagram of the transmission terminal of FIG. 1.

FIG. 5 is a hardware configuration diagram of the terminal 10 according to the embodiment of the present invention. As illustrated in FIG. 5, the terminal 10 of the embodiment includes a central processing unit (CPU) 101 that controls entire operation of the terminal 10, a read-only memory (ROM) 102 that stores a program used for controlling the CPU 101, such as an initial program loader (IPL), a random-access memory (RAM) 103 used as a work area for the CPU 101, a flash memory 104 that stores various types of data, such as the transmission terminal program, image data, and audio data, a solid state drive (SSD) 105 that controls reading/writing of various types of data from/to the flash memory 104 under control of the CPU 101, a medium drive 107 that controls reading/writing (storage) of data from/to a recording medium 106 such as a flash memory, the operation keys 108 operated in the case of, for example, selecting a counterpart terminal of the terminal 10, the power switch 109 for turning ON/OFF the power of the terminal 10, and a network interface (I/F) 111 for transmitting data using the communication network 2.

In addition, the terminal 10 includes the built-in camera 112, which captures an image of a subject and obtains image data under control of the CPU 101, an imaging element I/F 113 that controls driving of the camera 112, the built-in microphone 114, which receives an audio input, the built-in speaker 115, which outputs audio, an audio input/output I/F 116 that processes inputting/outputting of an audio signal between the microphone 114 and the speaker 115 under control of the CPU 101, a display I/F 117 that transmits image data to an external display 120 under control of the CPU 101, the external device connection I/F 118 connected to a connection port 1021g illustrated in FIG. 4 in order to connect various external devices, the alarm lamp 119, which indicates an abnormality of various functions of the terminal 10, and a bus line 110 such as an address bus and a data bus for electrically connecting the above-described elements as illustrated in FIG. 8.

The display 120 is a display element formed of liquid crystal or organic electroluminescence (EL) that displays an image of a subject, an operation icon, or the like. In addition, the display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

Note that the recording medium 106 is configured to be removable from the terminal 10. In addition, a non-volatile memory that reads or writes data under control of the CPU 101 is not limited to the flash memory 104, and an electrically erasable and programmable read-only memory (EE-PROM) may be used instead.

Further, the terminal program may be recorded in a file in an installable format or an executable format on a computer-readable recording medium such as the recording medium 106 and circulated. In addition, the terminal program may be stored on the ROM 102, instead of the flash memory 104.

Figure 6:
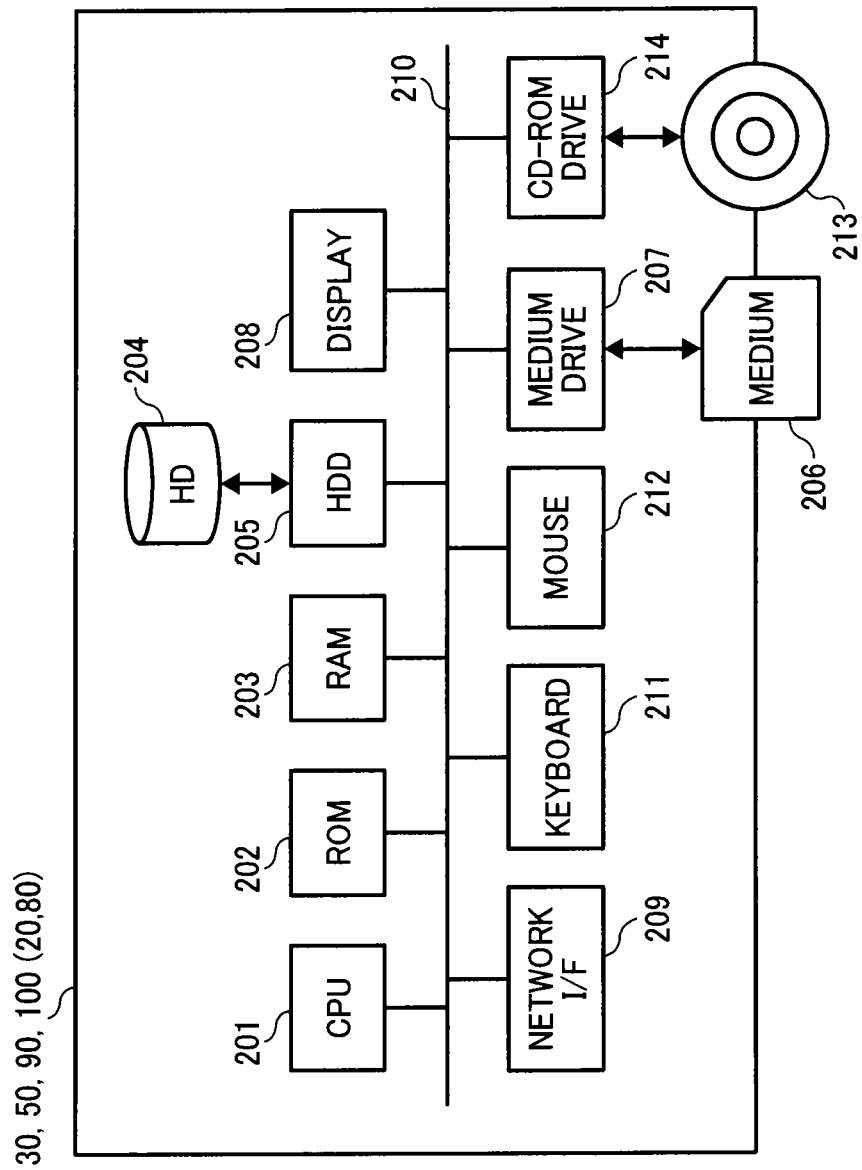
FIG. 6 is a hardware configuration diagram of a transmission management system, a relay device, a program providing system, a maintenance system, or a transmission terminal management system of the transmission system of FIG. 1.

FIG. 6 is a hardware configuration diagram of the transmission management system 50 according to the embodiment of the present invention. The transmission management system 50 includes a CPU 201 that controls entire operation of the transmission management system 50, a ROM 202 that stores a program used for driving the CPU 201, such as an IPL, a RAM 203 used as a work area for the CPU 201, the HD 204, which stores various types of data, such as the transmission management program, a hard disk drive (HDD) 205 that controls reading/writing of various types of data from/to the HD 204 under control of the CPU 201, a medium drive 207 that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions, selects a processing target, and moves the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements as illustrated in FIG. 6.

Note that the transmission management program may be recorded in a file in an installable format or an executable format on a computer-readable recording medium such as the recording medium 206 or the CD-ROM 213 and circulated. In addition, the transmission management program may be stored on the ROM 202, instead of the HD 204. In other words, any of the programs may be stored in any desired memory.

In addition, since the relay devices 30 have a hardware configuration that is the same as or similar to that of the above-described transmission management system 50, a description thereof is omitted. Note that the HD 204 stores a relay device program for controlling the relay devices 30. Also in this case, the relay device program may be recorded in a file in an installable format or an executable format on a computer-readable recording medium such as the recording medium 206 or the CD-ROM 213 and circulated. In addition, the relay device program may be stored on the ROM 202, instead of the HD 204.

In addition, since the program providing system 90 and the maintenance system 100 each have a hardware configuration that is the same as or similar to that of the above-described transmission management system 50, descriptions thereof are omitted. Note that the HD 204 stores a program providing program for controlling the program providing system 90. Also in this case, the program providing program may be recorded in a file in an installable format or an executable format on a computer-readable recording medium such as the recording medium 206 or the CD-ROM 213 and circulated. In addition, the program providing program may be stored on the ROM 202, instead of the HD 204.

Note that each of the above-described programs may be recorded on a computer-readable recording medium such as a compact disc recordable (CD-R), a digital versatile disk (DVD), or a Blu-ray disk, which serve as other examples of the above-described removable recording medium, and may be provided.

<<Functional Configuration>>

Figure 7:
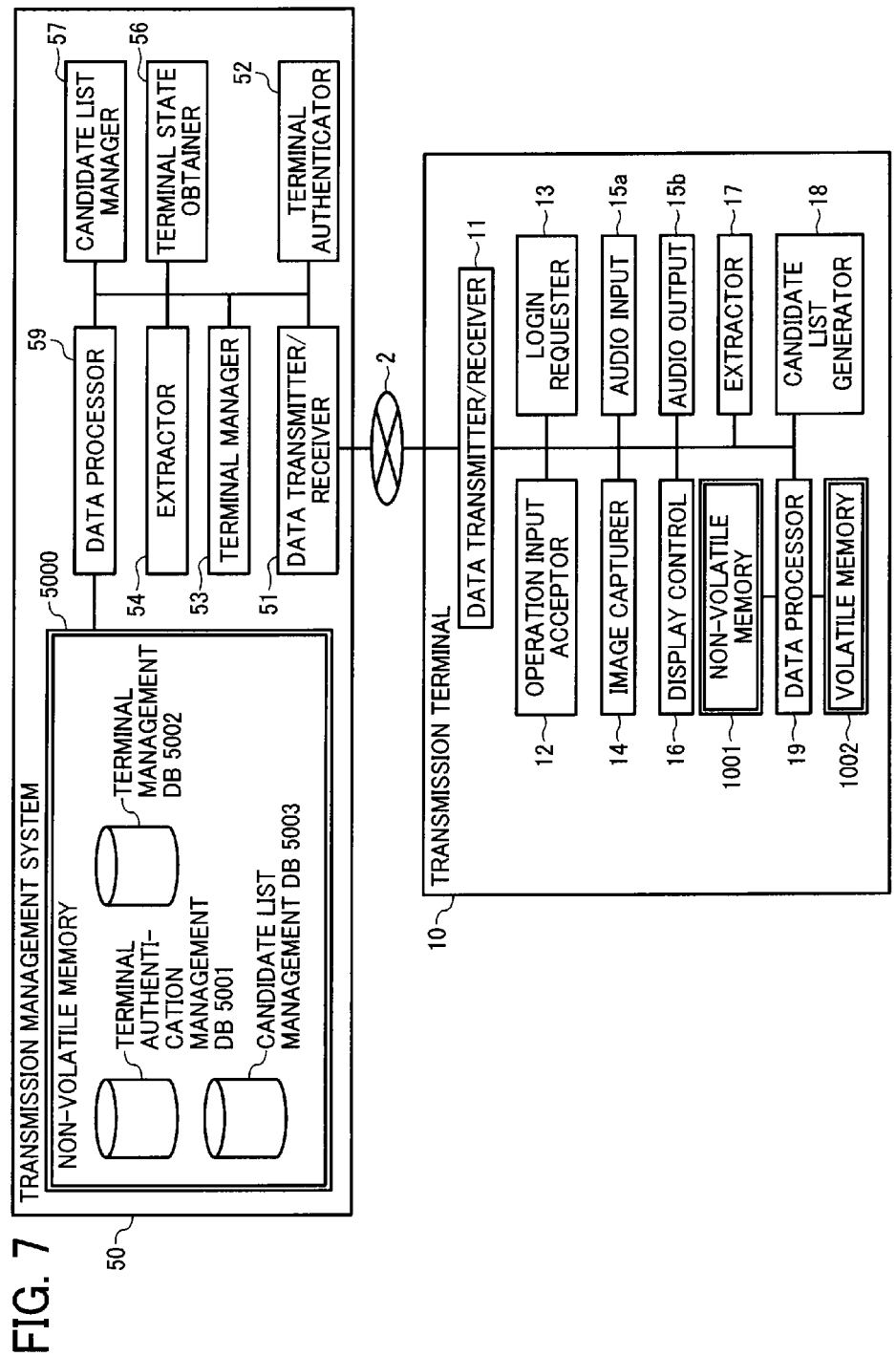
FIG. 7 is a functional block diagram of the transmission terminal and the transmission management system in the transmission system of FIG. 1.

Next, the functional configuration of the system 1 will be described. FIG. 7 is a functional block diagram of the terminal 10 and the transmission management system 50 included in the transmission system 1 of the embodiment. In FIG. 7, the terminal 10 and the transmission management system 50 are connected to be capable of communicating data via the communication network 2. In addition, since the program providing system 90 illustrated in FIG. 1 is not directly related to videoconference communication, the program providing system 90 is omitted in FIG. 7.

<Functional Configuration of Terminal>

The terminal 10 includes a data transmitter/receiver 11, an operation input acceptor 12, a login requester 13, an image capturer 14, an audio input 15$a$, an audio output 15$b$, a display control 16, an extractor 17, a candidate list generator 18, and a data processor 19. These elements are functions that are realized by or that are caused to function by operating any of hardware illustrated in FIG. 5 in response to a command from the CPU 101 in accordance with a terminal program expanded from the flash memory 104 to the RAM 103.

In addition, the terminal 10 includes a volatile memory 1002 configured by the RAM 103 illustrated in FIG. 5, and a non-volatile memory 1001 configured by the flash memory 104 illustrated in FIG. 5.

(Functional Configuration of Terminal)

Next, referring to FIGS. 5 and 7, functional configuration of the terminal 10 will be described. Note that, in the following description of functional configuration of the terminal 10, among elements illustrated in FIG. 5, relationships with main elements for realizing functional configuration of the terminal 10 will also be described.

The data transmitter/receiver 11 of the terminal 10 illustrated in FIG. 7 is realized by a command from the CPU 101 illustrated in FIG. 5 and by the network I/F 111 illustrated in FIG. 5, and performs transmission/reception of various types of data (or information) to/from another terminal 10, apparatus, or system via the communication network 2. Before starting communication with a desired counterpart terminal, the data transmitter/receiver 11 starts receiving, from the transmission management system 50, operation state information indicating the operation state of each terminal 10 serving as a candidate counterpart terminal. The operation state information not only indicates the operation state of each terminal 10 (whether the terminal 10 is online or offline), but also indicates a detailed state such as whether the terminal 10 whose state is online is now communicating or the user of the terminal 10 is not at the terminal 10. In addition, the operation state information not only indicates the operation state of each terminal 10, but also indicates various states, such as the state that the cable 120$c$ is disconnected from the terminal 10, the state that the terminal 10 can output audio but not images, or the state that the terminal 10 is muted.

The operation input acceptor 12 is realized by a command from the CPU 101 illustrated in FIG. 5 and by the operation keys 108 and the power switch 109 illustrated in FIG. 5, and accepts various inputs from the user. For example, when the user turns ON the power switch 109 illustrated in FIG. 5, the operation input acceptor 12 illustrated in FIG. 7 accepts the power ON operation and turns ON the power.

The login requester 13 is realized by a command from the CPU 101 illustrated in FIG. 5, and, in response to acceptance of the above-mentioned power ON operation, automatically transmits, from the data transmitter/receiver 11 to the transmission management system 50 via the communication network 2, login request information indicating a login request and the current IP address of a request sender terminal. In addition, when the user turns the power switch 109 from ON to OFF, the data transmitter/receiver 11 transmits to the transmission management system 50 state information indicating that the power is to be turned OFF, and then the operation input acceptor 12 completely turns OFF the power. Accordingly, the transmission management system 50 side can detect that the power of the terminal 10 is turned from ON to OFF.

The image capturer 14 is realized by a command from the CPU 101 illustrated in FIG. 5 and by the camera 112 and the imaging element I/F 113 illustrated in FIG. 5. The image capturer 14 captures an image of an object and outputs image data obtained by capturing the image.

The audio input 15a is realized by a command from the CPU 101 illustrated in FIG. 5 and by the audio input/output I/F 116 illustrated in FIG. 5. After the voice of the user is converted to an audio signal by the microphone 114, the audio input 15a receives audio data according to this audio signal. The audio output 15b is realized by a command from the CPU 101 illustrated in FIG. 5 and by the audio input/output I/F 116 illustrated in FIG. 5, and outputs the audio signal according to the audio data to the speaker 115, and the speaker 115 outputs audio.

The display control 16 is realized by a command from the CPU 101 illustrated in FIG. 5 and by the display I/F 117 illustrated in FIG. 5, and performs control for transmitting image data to an external display 120.

The extractor 17 is realized by a command from the CPU 101 illustrated in FIG. 5, and extracts various types of data (or information) from the volatile memory 1002.

Figure 12:
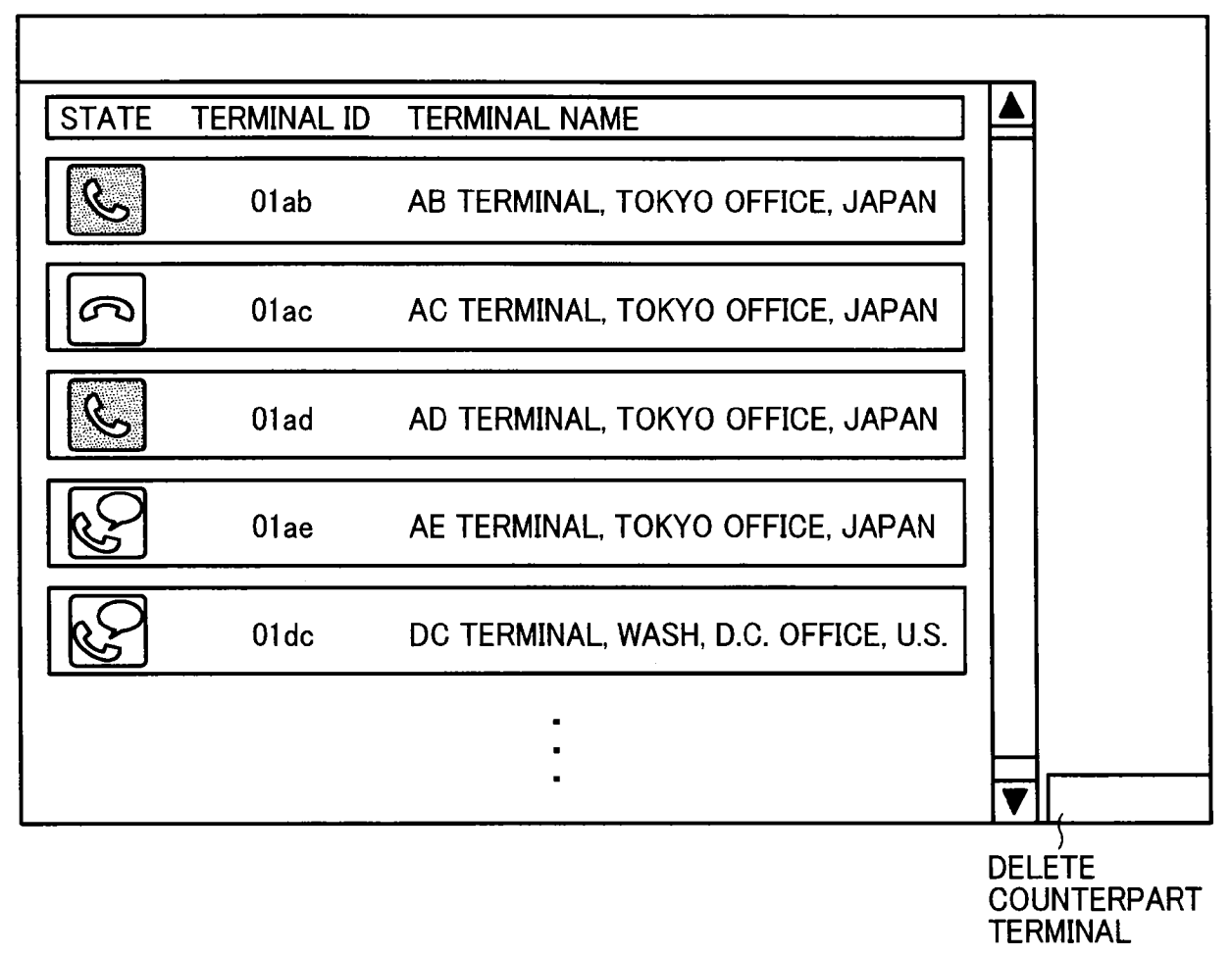

The candidate list generator 18 generates and updates a candidate list in which an icon indicates the state of a candidate counterpart terminal as illustrated in FIG. 12 on the basis of candidate list information described later and state information of each terminal 10 serving as a candidate counterpart terminal, which are received from the transmission management system 50.

In addition, the data processor 19 is realized by a command from the CPU 101 illustrated in FIG. 5 and by the SSD 105 illustrated in FIG. 5, and performs processing to store various types of data in the non-volatile memory 1001 or to read various types of data stored in the non-volatile memory 1001. The non-volatile memory 1001 stores a terminal identification (ID) serving as an example of identification information for identifying the terminal 10, a password, and the like. Further, the data processor 19 performs processing to store various types of data in the volatile memory 1002 or to read various types of data stored in the volatile memory 1002. In addition, every time image data and audio data are received in performing communication with a counterpart terminal, the volatile memory 1002 overwrites the image data and audio data. Among these items of data, on the basis of image data before being overwritten, an image is displayed on the display 120, and, on the basis of audio data before being overwritten, audio is output from the speaker 115.

Note that, in the embodiment, a terminal ID and a relay device ID described later indicate identification information such as a language, a character(s), a symbol(s), or various marks used to uniquely identify a corresponding terminal 10 and relay device 30. In addition, a terminal ID and a relay device ID may be identification information including a combination of at least two of the above-mentioned language, character(s), symbol(s), and various marks.

<Functional Configuration of Management System>

The transmission management system 50 includes a data transmitter/receiver 51, a terminal authenticator 52, a terminal manager 53, an extractor 54, a terminal state obtainer 56, a candidate list manager 57, and a data processor 59. These elements are functions that are realized by or that are caused to function by operating any of hardware illustrated in FIG. 6 in response to a command from the CPU 201 in accordance with a management system program expanded from the HD 204 to the RAM 203. In addition, the transmission management system 50 includes a non-volatile memory 5000 that maintains storage of various types of data (or information) even when the power of the transmission management system 50 is turned OFF, and the non-volatile memory 5000 is configured by the HD 204 illustrated in FIG. 6. In addition, the non-volatile memory 5000 stores candidate list frame data illustrated in FIG. 12 (which is data of a candidate list frame portion illustrated in FIG. 12, and which does not include an icon indicating a specific operation state, a terminal ID, or a terminal name).

(Terminal Authentication Management Table)

In the non-volatile memory 5000, a terminal authentication management DB 5001 configured by a terminal authentication management table such as that illustrated in FIG. 8 is configured. In the terminal authentication management table, a password is managed in association with each of terminal IDs of all terminals 10 managed by the transmission management system 50. For example, the terminal authentication management table illustrated in FIG. 8 indicates that the terminal ID of the terminal 10aa is "01aa", and the password of the terminal 10aa is "aaaa", (Terminal Management Table)

In the non-volatile memory 5000, a terminal management DB 5002 configured by a terminal management table such as that illustrated in FIG. 9 is configured. In the terminal management table, for the terminal ID of each terminal 10, a terminal name of the terminal 10, the operation state of the terminal 10, a date/time received at which login request information described later is received by the transmission management system 50, and the IP address of the terminal 10 are managed in association with one another. For example, in the terminal management table illustrated in FIG. 9, it is indicated that the terminal 10aa with the terminal ID "01aa" has the terminal name "AA terminal, Tokyo office, Japan", the operation state "online (communication OK)", the date/time received at which login request information is received by the transmission management system 50 "13:40, Nov. 10, 2009", and the IP address "1.2.1.3".

(Candidate List Management Table)

Further in the non-volatile memory 5000, a candidate list management DB 5003 configured by a candidate list management table such as that illustrated in FIG. 10 is configured. A candidate list of each terminal 10 is managed in the candidate list management table. That is, in the candidate list management table, the terminal IDs of all counterpart terminals 10 registered as candidate counterpart terminals are managed in association with the terminal ID of a request sender terminal that gives a request to start communication in a videoconference. For example, in the candidate list management table illustrated in FIG. 10, it is indicated that candidates for a counterpart terminal to which a request sender terminal (terminal 10aa) whose terminal ID is "01aa" can give a request to start communication in a videoconference are the terminal 10ab whose terminal ID is "01ab", the terminal 10ba whose terminal ID is "01ba", the terminal 10bb whose terminal ID is "01bb", and so forth. These candidates for a counterpart terminal are updated by addition or deletion in response to an addition or deletion request from an arbitrary request sender terminal to the transmission management system 50. Note that, in the candidate list management DB 5003 (see FIG. 10), not only the terminal ID of a counterpart terminal registered as a candidate for a counterpart terminal, but also a counterpart terminal name managed for each terminal ID in the terminal management table (see FIG. 9) may be managed in association therewith.

(Functional Configuration of Transmission Management System)

Next, functional configuration of the transmission management system 50 will be described in more details. Note that, in the following description of each functional configuration of the transmission management system 50, among elements illustrated in FIG. 6, relationships with main elements for realizing functional configuration portions of the transmission management system 50 will also be described.

The data transmitter/receiver 51 is realized by a command from the CPU 201 illustrated in FIG. 6 and by the network I/F 209 illustrated in FIG. 6, and performs transmission/reception of various types of data (or information) to/from another terminal, apparatus, or system via the communication network 2.

The terminal authenticator 52 is realized by a command from the CPU 201 illustrated in FIG. 6, and performs terminal authentication by searching the terminal authentication management DB 5001 of the non-volatile memory 5000 by using a terminal ID and a password included in login request information received via the data transmitter/receiver 51 as search keys and determining whether the same pair of a terminal ID and a password is managed in the terminal authentication management DB 5001.

The terminal manager 53 is realized by a command from the CPU 201 illustrated in FIG. 6. In order to manage the operation state of a request sender terminal that has given a login request, the terminal manager 53 manages the terminal ID of the request sender terminal, the operation state of the request sender terminal, the date/time received at which login request information is received by the transmission management system 50, and the IP address of the request sender terminal by storing these items of information in association with one another in the terminal management DB 5002 (see FIG. 9). In addition, on the basis of operation state information sent from the terminal 10 indicating that power is turned OFF when the user turns the power switch 109 of the terminal 10 from ON to OFF, the terminal manager 53 changes the operation state indicating an online state to an offline state in the terminal management DB 5002 (see FIG. 9).

The extractor 54, which is realized by a command from the CPU 201 illustrated in FIG. 6, searches the candidate list management DB 5003 (see FIG. 10) by using the terminal ID of a request sender terminal that has given a login request as a key, and reads the terminal ID of a candidate counterpart terminal that is able to communicate with the request sender terminal, thereby extracting the terminal ID. In addition, the extractor 54 searches the candidate list management DB 5003 (see FIG. 10) by using the terminal ID of a request sender terminal that has given a login request as a key and also extracts the terminal ID of another request sender terminal that registers the terminal ID of the former request sender terminal as a candidate counterpart terminal. In addition, the extractor 54 searches the terminal management DB 5002 (see FIG. 9) by using the terminal ID of a candidate counterpart terminal extracted by the extractor 54 as a search key, and reads the operation state of each terminal ID extracted by the extractor 54. Accordingly, the extractor 54 can obtain the operation state of a candidate counterpart terminal that is able to communicate with a request sender terminal that has given a login request. In addition, the extractor 54 searches the terminal management DB 5002 (see FIG. 9) by using a terminal ID extracted by the extractor 54 as a search key, and also extracts the operation state of a request sender terminal that has given a login request.

The terminal state obtainer 56 is realized by a command from the CPU 201 illustrated in FIG. 6, and searches the terminal management DB 5002 (see FIG. 9) by using a terminal ID or a counterpart terminal name as a search key, thereby confirming a corresponding operation state.

The candidate list manager 57 is realized by a command from the CPU 201 illustrated in FIG. 6, has a function as an adder, and adds the terminal ID of a counterpart terminal for the terminal ID of each request sender terminal (for the candidate list of each terminal 10) in the candidate list management DB 5003 (see FIG. 10). In addition, the candidate list manager 57 also has a function as a deleter, and, in response to reception of a request to delete the terminal ID of a counterpart terminal (second transmission terminal) from a candidate list of a request sender terminal (first transmission terminal), not only deletes the terminal ID of the counterpart terminal (second transmission terminal) from the candidate list of the request sender terminal (first transmission terminal), but also deletes the terminal ID of the request sender terminal (first transmission terminal) from a candidate list of the counterpart terminal (second transmission terminal). That is, in the embodiment, in the case of registering the terminal ID of the second transmission terminal in the candidate list of the first transmission terminal, the terminal ID of the first transmission terminal is registered in the candidate list of the second transmission terminal. In addition, in the case of deleting the terminal ID of the second transmission terminal from the candidate list of the first transmission terminal, the terminal ID of the first transmission terminal is deleted from the candidate list of the second transmission terminal.

The data processor 59 is executed by a command from the CPU 201 illustrated in FIG. 6 and by the HDD 205 illustrated in FIG. 6, and performs processing to store various types of data in the non-volatile memory 5000 or read various types of data stored in the non-volatile memory 5000.

<<Process or Operation>>

Figure 11B:
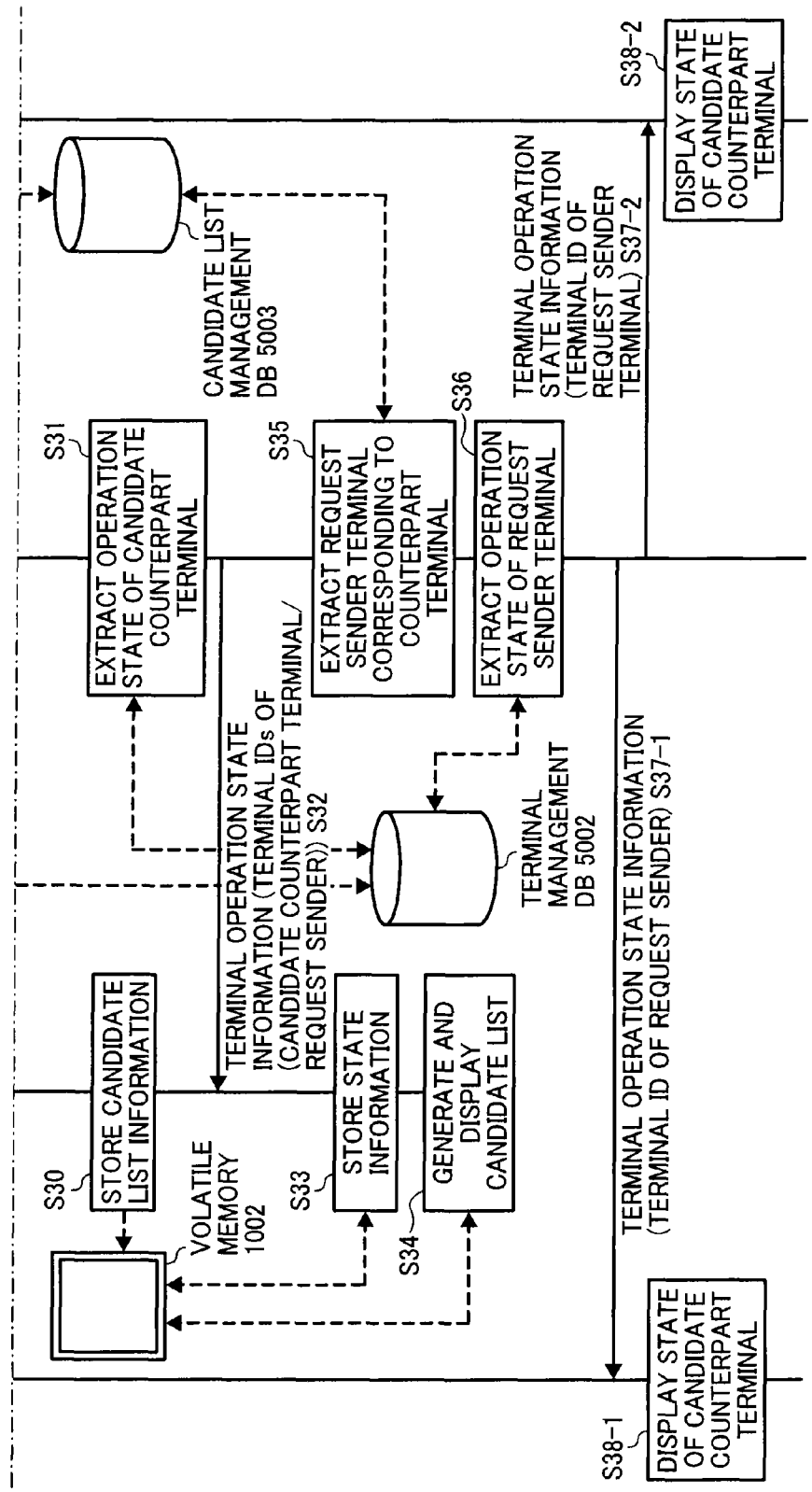

Next, referring to FIGS. 11 to 16, operation of managing candidate counterpart terminal information will be described. At first, a process of transmitting/receiving each item of management information at a preparation step before starting communication, for example, between the terminal 10aa and the terminal 10db will be described using FIGS. 11 and 12. FIG. 11 is a sequence diagram illustrating a process at a preparation step for starting communication between transmission terminals. FIG. 12 is a conceptual diagram illustrating a candidate list. Note that FIG. 11 illustrates a process of transmitting/receiving various items of management information entirely by a management information session sei.

First, when the user turns ON the power switch 109 illustrated in FIG. 5, the operation input acceptor 12 illustrated in FIG. 7 accepts the power ON operation and turns ON the power (step S21). In response to acceptance of the power ON operation, the login requester 13 automatically transmits login request information indicating a login request from the data transmitter/receiver 11 to the transmission management system 50 via the communication network 2 (step S22). The login request information includes a terminal ID for identifying the terminal 10aa, which serves as a request sender terminal, and a password. The terminal ID and the password are data that have been read via the data processor 19 from the non-volatile memory 1001 and sent to the data transmitter/receiver 11. In the case of transmitting login request information from the terminal 10aa to the transmission management system 50, the transmission management system 50, which is a receiving side, can obtain the IP address of the terminal 10aa, which is a transmitting side.

Next, the terminal authenticator 52 of the transmission management system 50 performs terminal authentication by searching the terminal authentication management DB (see FIG. 8) of the non-volatile memory 5000 by using the terminal ID and the password included in the login request information received via the data transmitter/receiver 51 as search keys, and determining whether the same terminal ID and the same password are managed in the terminal authentication management DB 5001 (step S23). In the case where the terminal authenticator 52 determines that the login request is a login request from a terminal 10 that has a legitimate use authority since the same terminal ID and the same password are managed, the terminal manager 53 stores, in the terminal management DB 5002 (see FIG. 9), the operation state, the date/time received at which the above-described login request information is received, and the IP address of the terminal 10aa for each record indicated by the terminal ID and the counterpart terminal name of the terminal 10aa (step S24). Accordingly, the operation state "online", the date/time received "13:40, Nov. 10, 2009", and the IP address "1.2.1.3" are managed in association with the terminal ID "01aa" in the terminal management table illustrated in FIG. 13.

The data transmitter/receiver 51 of the transmission management system 50 transmits authentication result information indicating an authentication result obtained by the above-described terminal authenticator 52 to the request sender terminal (terminal 10aa), which has given the above-mentioned login request, via the communication network 2 (step S25). In the embodiment, the case in which it has been determined by the terminal authenticator 52 that the terminal 10aa is a terminal that has a legitimate use authority will be described as follows.

In response to reception, by the request sender terminal (terminal 10aa), of the authentication result information indicating that the request sender terminal is a terminal that has a legitimate use authority, the data transmitter/receiver 11 transmits candidate list request information indicating a request for the candidate list to the transmission management system 50 via the communication network 2 (step S26). Accordingly, the data transmitter/receiver 51 of the transmission management system 50 receives the candidate list request information.

Next, the extractor 54 searches the candidate list management DB 5003 (see FIG. 10) by using the terminal ID "01aa" of the request sender terminal (terminal 10aa) which has given the login request as a search key, extracts the terminal ID of a candidate counterpart terminal that is able to communicate with the request sender terminal (terminal 10aa), and extracts a counterpart terminal name corresponding to this terminal ID by reading the counterpart terminal name from the terminal management DB (see FIG. 9) (step S27). Here, the terminal IDs ("01ab", "01ba", "01bb", . . . ) of counterpart terminals (10ab, 10ba, 10bb, . . . ) corresponding to the terminal ID "01aa" of the request sender terminal (terminal 10aa), and terminal names ("AB terminal, Tokyo office, Japan", "BA terminal, Osaka office, Japan", "BB terminal, Osaka office, Japan", . . . ) corresponding to these terminal IDs are extracted. Note that, in the case where not only terminal IDs but also counterpart terminal names corresponding to the terminal IDs are managed in the candidate list management DB 5003 (see FIG. 10), the counterpart terminal names corresponding to the terminal IDs may be read not from the terminal management table (see FIG. 9), but from the candidate list management table in step S27.

Next, the data transmitter/receiver 51 of the transmission management system 50 reads candidate list frame data from the memory 5000 via the data processor 59 (step S28), and transmits "candidate list information (candidate list frame, terminal IDs, and counterpart terminal names)", which includes the candidate list frame and the terminal IDs and the counterpart terminal names extracted by the extractor 54, to the request sender terminal (terminal 10aa) (step S29). Accordingly, in the request sender terminal (terminal 10aa), the data transmitter/receiver 11 receives the candidate list information, and the data processor 19 stores the candidate list information in the volatile memory 1002 (step S30).

As described above, in the embodiment, each terminal 10 does not manage candidate list information, but the transmission management system 50 centrally manages candidate list information of all terminals 10. Therefore, even in the case where a new terminal 10 is included in the transmission system 1, a terminal 10 of a new model is included in place of an already-included terminal 10, or the appearance of the candidate list frame is to be changed, the transmission management system 50 centrally handles these cases, and hence, the burden of each terminal 10 changing candidate list information can be removed.

In addition, the extractor 54 of the transmission management system 50 searches the terminal management DB 5002 (see FIG. 9) by using the terminal IDs ("01ab", "01ba", "01bb", . . . ) of candidate counterpart terminals, which are extracted by the above-mentioned extractor 54, as search keys, and reads a corresponding operation state for each terminal ID extracted by the above-mentioned extractor 54, thereby obtaining the operation state of each of the terminals (10ab, 10ba, 10bb, . . . ) serving as candidate counterpart terminals (step S31).

Next, the data transmitter/receiver 51 transmits "terminal operation state information" including the terminal IDs of the candidate counterpart terminals 10, such as the terminal ID "01ab" and the operation state "online (communication OK)" of the terminal (terminal 10ab), to the request sender terminal (terminal 10aa) via the communication network 2 (step S32). The data transmitter/receiver 51 may collectively or separately transmit the "terminal operation state information" of the candidate counterpart terminals, to the request sender terminal (terminal 10aa).

Next, the data processor 19 of the request sender terminal (terminal 10aa) stores the terminal state information, received from the transmission management system 50, in the volatile memory 1002 (step S33). Thus, by receiving the above-described state information of each terminal 10, the request sender terminal (terminal 10aa) can obtain the current operation state of each candidate for a counterpart terminal, such as the terminal 10ab which is able to communicate with the request sender terminal (terminal 10aa).

Next, the candidate list generator 18 of the request sender terminal (terminal 10aa) generates a candidate list in which the state of a terminal 10 serving as a candidate counterpart terminal is reflected, on the basis of the candidate list information and the terminal state information stored in the volatile memory 1002, and controls the timing at which the display control 16 displays the candidate list on the display 120 illustrated in FIG. 5 (step S34). Note that, in the candidate list illustrated in FIG. 12, an icon indicating the operation state of each terminal 10 indicates the following from top: "online (communication OK)", "offline", "online (communication OK)", and "online (communicating)".

Further, the extractor 54 of the transmission management system 50 searches the candidate list management DB 5003 (see FIG. 10) on the basis of the terminal ID "01aa" of the request sender terminal (terminal 10aa) which has given the login request, thereby extracting the terminal ID of another request sender terminal that registers the terminal ID "01aa" of the above-mentioned request sender terminal (terminal 10*aa*) as a candidate for a counterpart terminal (step S35). In the candidate list management table illustrated in FIG. 10, the terminal IDs of other request sender terminals to be extracted are "01*ab*", "01*ba*", and "01*db*".

Next, the extractor 54 of the transmission management system 50 searches the terminal management DB 5002 (see FIG. 9) on the basis of the terminal ID "01*aa*" of the request sender terminal (terminal 10*aa*) which has given the login request, and obtains the operation state of the request sender terminal (terminal 10*aa*) which has given the login request (step S36).

The data transmitter/receiver 51 transmits "terminal state information" including the terminal ID "01*aa*" and the operation state "online" of the request sender terminal (terminal 10*aa*), obtained in step S36 described above, to terminals (10*ab* and 10*db*) whose operation states are "online, communication OK" in the terminal management DB 5002 (see FIG. 9), among the terminals (10*ab*, 10*ba*, and 10*db*) according to the terminal IDs ("01*ab*", "01*ba*", and "01*db*") extracted in step S35 described above (steps S37-1 and S37-2). When transmitting the terminal state information to the terminals (10*ab* and 10*db*), the data transmitter/receiver 51 refers to the IP addresses of the terminals, which are managed in the terminal management table illustrated in FIG. 9, on the basis of the terminal IDs ("01*ab*" and "01*db*"). Accordingly, the terminal ID "01*aa*" and the operation state "online" of the request sender terminal (terminal 10*aa*) which has given the login request can be conveyed to other counterpart terminals (10*ab* and 10*db*) that are able to communicate with the request sender terminal (terminal 10*aa*) which has given the login request, which serves as a counterpart terminal.

In the case of other terminals 10, as in step S21 described above, when the user turns ON the power switch 109 illustrated in FIG. 6, the operation input acceptor 12 illustrated in FIG. 7 accepts the power ON operation and performs processing that is the same as steps S22 to S38-1 and S38-2 described above, descriptions of which are omitted.

Figure 13:
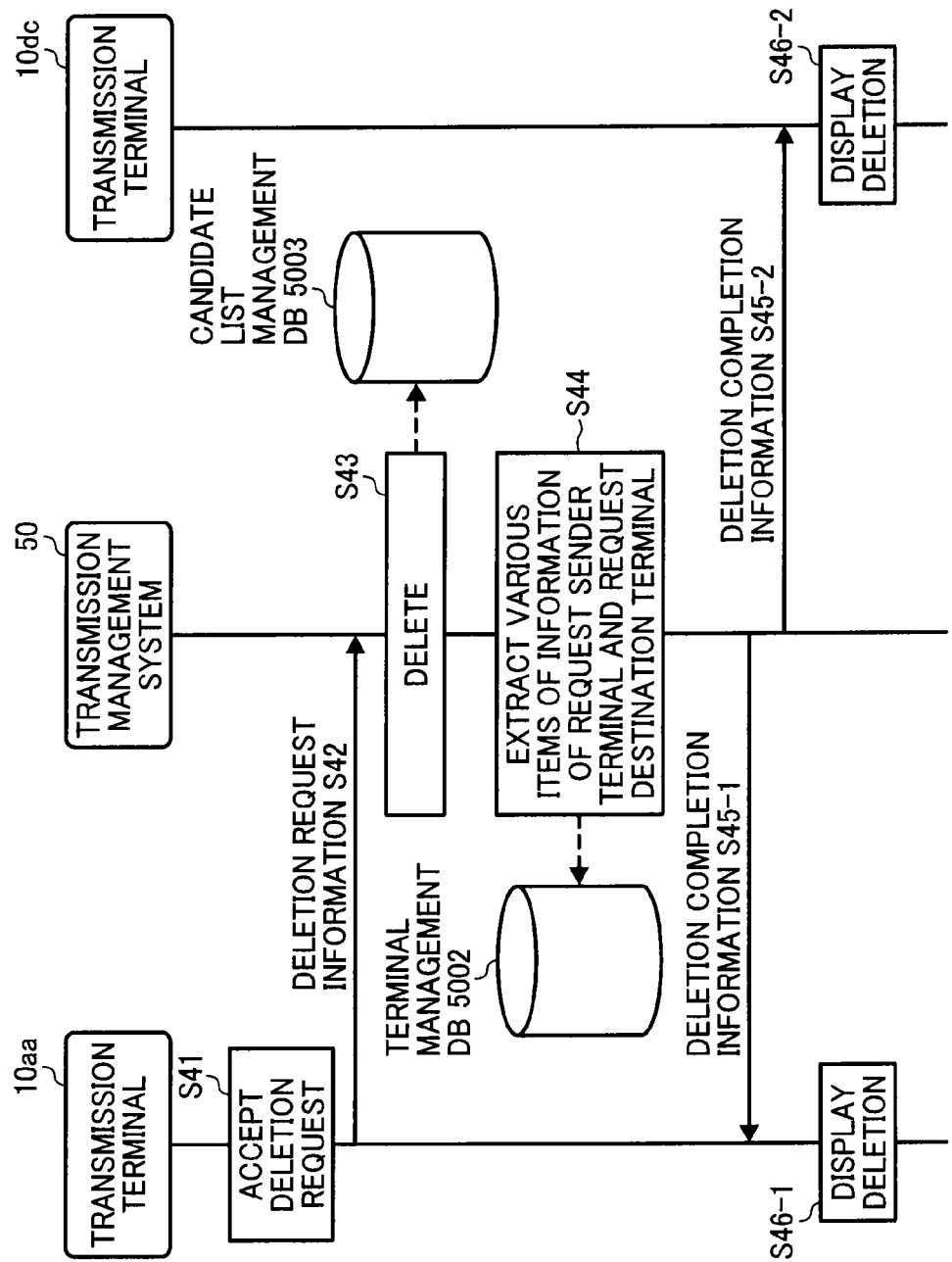
FIG. 13 is a data sequence diagram illustrating operation of deleting a candidate counterpart terminal.
Figure 14:
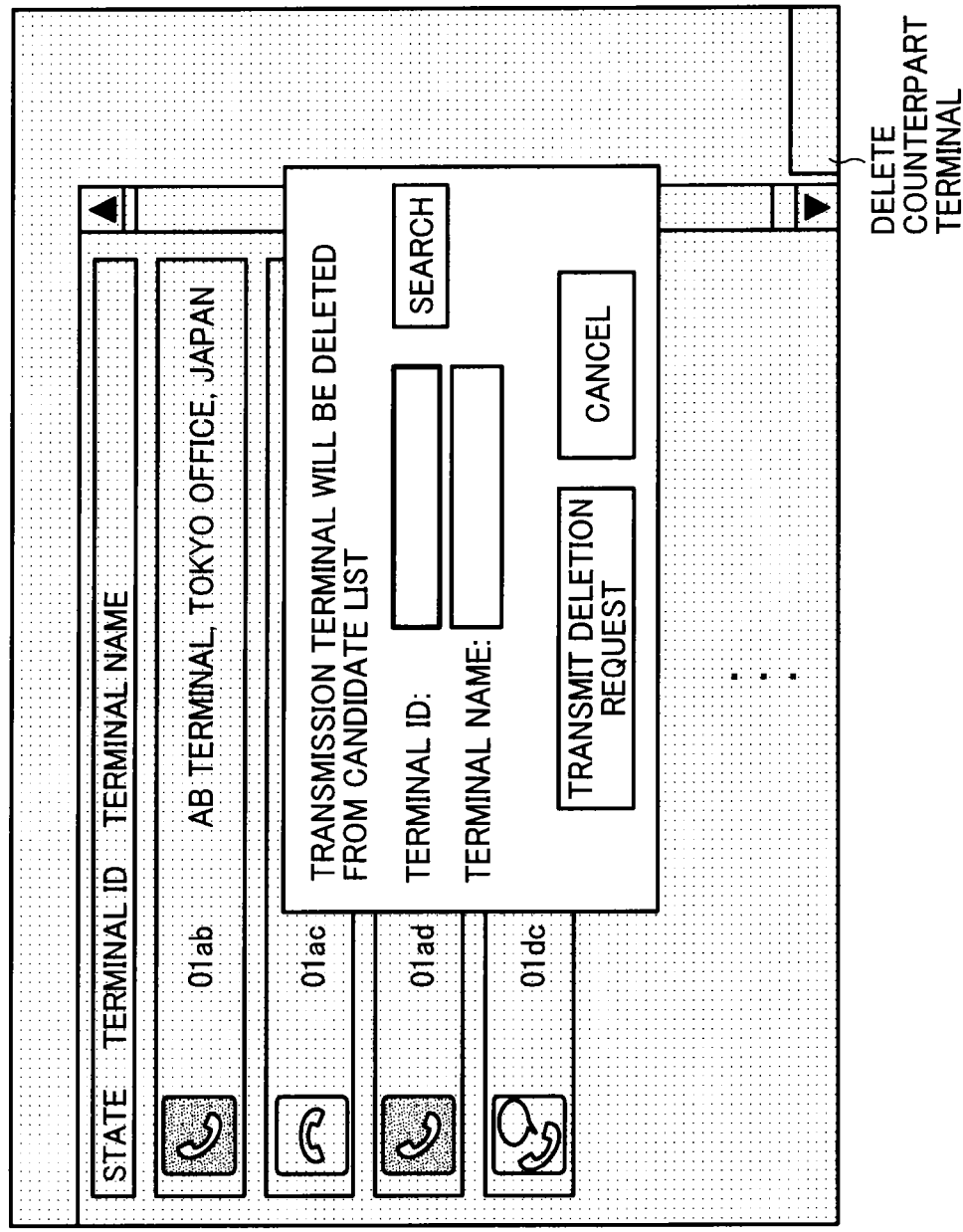
FIG. 14 is a conceptual diagram illustrating an example deletion request acceptance screen.
Figure 15:
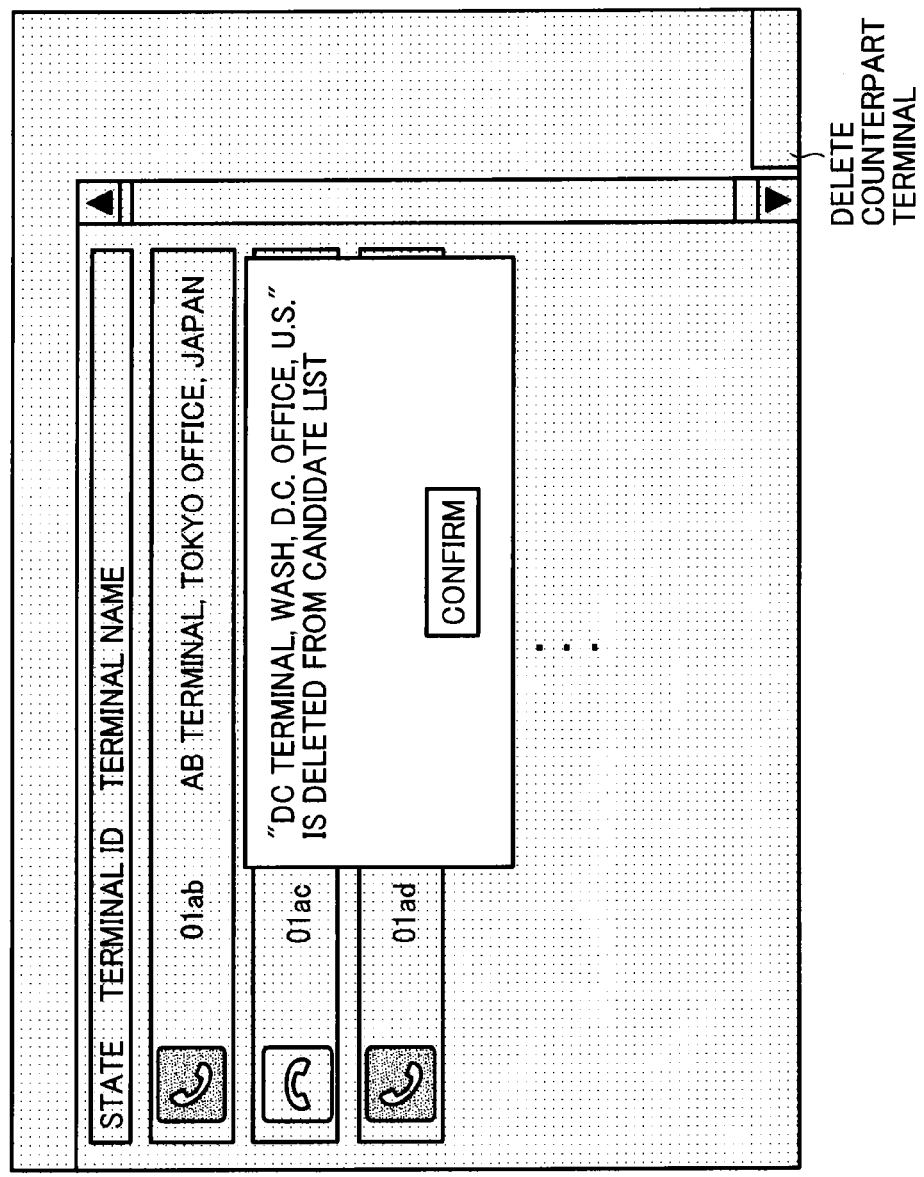
FIG. 15 is a conceptual diagram illustrating an example deletion completion screen.
Figure 16:
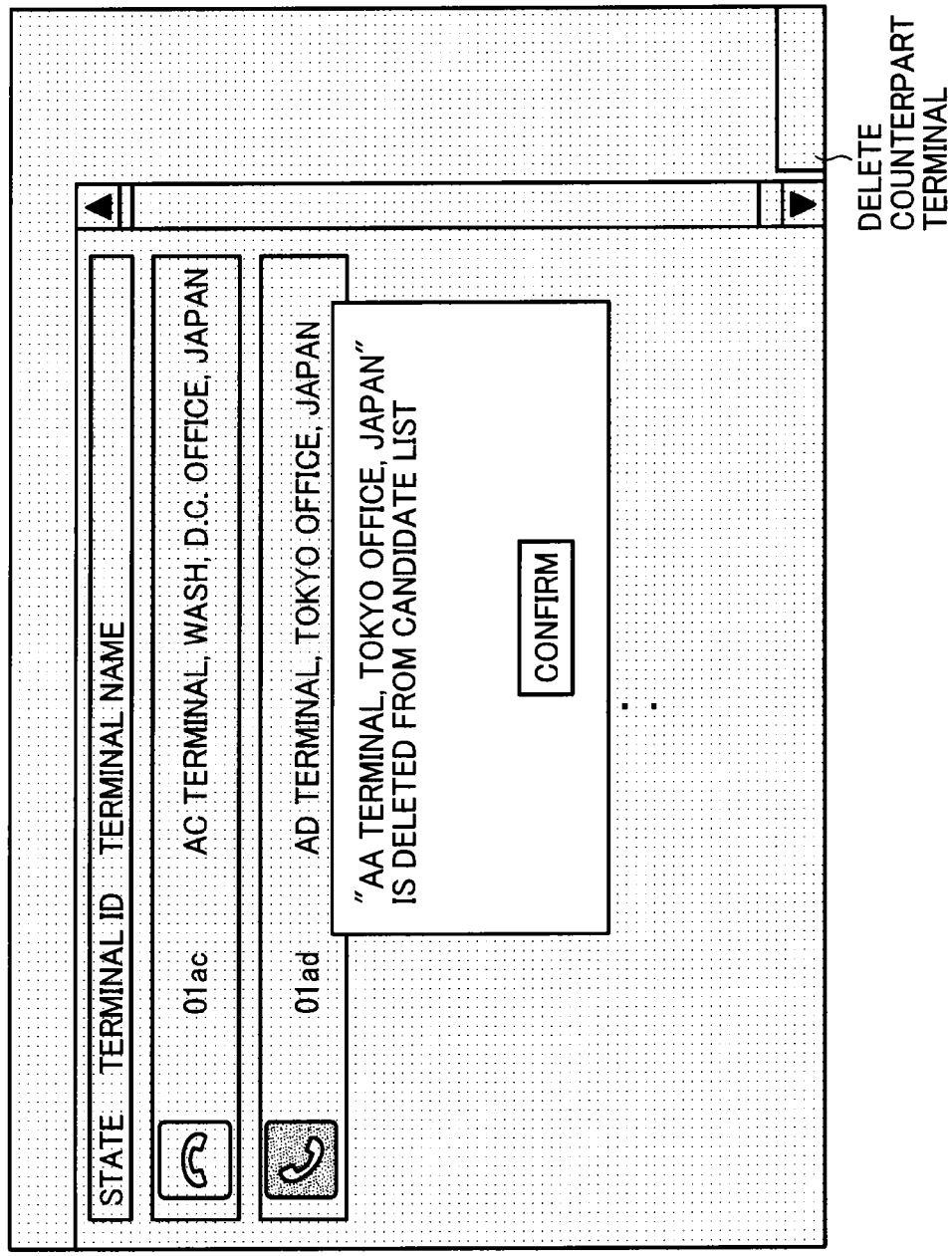
FIG. 16 is a conceptual diagram illustrating an example deletion completion screen.

Next, referring to FIGS. 13 to 16, a candidate counterpart terminal deletion process will be described. The embodiment discusses the case in which a request sender terminal (terminal 10*aa*) gives a request to delete a request destination terminal (terminal 10*dc*) from the candidate list of the request sender terminal. Note that FIG. 13 is a sequence diagram illustrating a candidate counterpart terminal deletion process. FIG. 14 is a conceptual diagram illustrating a deletion request acceptance screen, to be displayed at the request sender terminal (terminal 10*aa*). FIG. 15 is a conceptual diagram illustrating a deletion completion screen, to be displayed at the request sender terminal (terminal 10*aa*). FIG. 16 is a conceptual diagram illustrating a deletion completion screen, to be displayed at the request destination terminal (terminal 10*dc*).

It is assumed that the user a of the request sender terminal (terminal 10*aa*) operates the operation keys 108 and presses a "delete counterpart terminal" key illustrated in the lower right-hand corner of the candidate list illustrated in FIG. 12. In response to the user input, the operation input acceptor 12 accepts the pressing of the key, and the display control 16 displays a screen on the display 120*aa* based on deletion request acceptance screen data stored in the volatile memory 1002, to start the process of accepting a counterpart terminal deletion request (step S41).

Next, when the user a inputs, with the operation keys 108, the terminal ID or terminal name of a terminal that the user a wants to delete from candidate counterpart terminals on the deletion request acceptance screen illustrated in FIG. 14 (here, the terminal ID "01*dc*" is input) and presses a "transmit deletion request" key, the operation input acceptor 12 accepts the input, and the data transmitter/receiver 11 of the request sender terminal (terminal 10*aa*) transmits deletion request information indicating a request to delete the terminal from candidate counterpart terminals, to the transmission management system 50 via the communication network 2 (step S42). The deletion request information includes the terminal ID "01*aa*" of the request sender terminal, which is for identifying the request sender terminal (terminal 10*aa*), and the terminal ID "01*dc*" of the request destination terminal, which is for identifying the request destination terminal (terminal 10*dc*). Accordingly, the data transmitter/receiver 51 of the transmission management system 50 receives the deletion request information.

Next, in the transmission management system 50, the candidate list manager 57 deletes, in accordance with the deletion request information, the terminal ID "01*dc*" of the request destination terminal associated with the terminal ID "01*aa*" of the request sender terminal (the candidate list of the request sender terminal), and the terminal ID "01*aa*" of the request sender terminal associated with the terminal ID "01*dc*" of the request destination terminal (the candidate list of the request destination terminal), from the candidate list management DB (see FIG. 10) (step S43).

Next, the extractor 54 searches the terminal management DB 5002 (see FIG. 9) on the basis of the terminal ID "01*aa*" of the request sender terminal and the terminal ID "01*dc*" of the request destination terminal, thereby extracting items of corresponding information (counterpart terminal names and operation states) thereof (step S44). The data transmitter/receiver 51 transmits deletion completion information to the request sender terminal (terminal 10*aa*) and the request destination terminal (terminal 10*dc*) (steps S45-1 and S45-2). Among these items of information, the deletion completion information transmitted to the request sender terminal (terminal 10*aa*) includes a message indicating that deletion is completed, and items of information (terminal ID, counterpart terminal name, and operation state) of the request destination terminal (terminal 10*dc*). The deletion completion information transmitted to the request destination terminal (terminal 10*dc*) includes a message indicating that deletion is completed, and items of information (terminal ID, counterpart terminal name, and operation state) of the request sender terminal (terminal 10*aa*).

In the request sender terminal (terminal 10*aa*) and the request destination terminal (terminal 10*dc*), each display control 16 displays a screen indicating completion on a corresponding one of the displays (120*aa* and 120*dc*) (steps S46-1 and S46-2). FIG. 15 illustrates a deletion completion screen displayed on the display 120*aa* of the request sender terminal (terminal 10*aa*). The process ends when the user a presses a "confirm" key. FIG. 16 illustrates a deletion completion screen displayed on the display 120*dc* of the request destination terminal (terminal 10*dc*). The process ends when the user d presses a "confirm" key. In this manner, when the deletion completion screens illustrated in FIGS. 15 and 16 are displayed, the user a and the user d can see that their terminals are deleted from candidate counterpart terminals in each other's candidate list.

Note that, on the deletion completion screen on a terminal that does not give a deletion request (the terminal 10*dc* in this case), in the case where this terminal is requested by a plurality of terminals 10 to be deleted, it may be displayed that this terminal (terminal 10*dc*) is deleted from the candidate lists of these terminals 10.

According to the management system 3 in the embodiment as described above, in response to reception of a request from a request sender terminal (terminal 10*aa*) to delete the terminal ID of a counterpart terminal (terminal 10*dc*) from the candidate list of the request sender terminal (terminal 10*aa*), not only the terminal ID of the counterpart terminal (terminal 10*dc*) is deleted from the candidate list of the request sender terminal (terminal 10*aa*), but also the terminal ID of the request sender terminal (terminal 10*aa*) is deleted from the candidate list of the counterpart terminal (terminal 10*dc*). The management system 3 transmits, to the counterpart terminal (terminal 10*dc*) which has not given a deletion request, a message (deletion completion information) indicating that the terminal ID of the request sender terminal (terminal 10*aa*) is deleted from the candidate list of the counterpart terminal (terminal 10*dc*). Accordingly, the user of the counterpart terminal (terminal 10*dc*) can instantly know that the terminal ID of the counterpart terminal (terminal 10*dc*) has been deleted from the candidate list of the request sender terminal (terminal 10*aa*).

In addition, the management system 3 also transmits, to the request sender terminal (terminal 10*aa*) which has given the deletion request, a message (deletion completion information) indicating that the terminal ID of the request sender terminal (terminal 10*aa*) has been deleted from the candidate list of the request destination terminal (terminal 10*dc*). Accordingly, the user of the request sender terminal (terminal 10*aa*) can instantly know that deletion of the terminal ID of the request sender terminal (terminal 10*aa*) from the candidate list of the counterpart terminal (terminal 10*dc*) has been completed.

Next, referring to FIGS. 17 to 24, a transmission system 1A is explained according to an embodiment of the present invention. The transmission system 1A of this embodiment is different from the transmission system 1 of FIG. 1 in the following points: user PC terminals (20*a*, 20*b*, 20*c*, and 20*d*) are further connected to the LANs (2*a*, 2*b*, 2*c*, and 2*d*), respectively; and a transmission terminal management system 80 is connected to the Internet 2*i*. Note that the same reference numeral is given to a configuration or a function that is the same as the above-described embodiment of FIGS. 1 to 16, and a description thereof is omitted.

Also in the following description, the user PC terminals (20*a*, 20*b*, 20*c*, and 20*d*) are represented as the PCs (20*a*, 20*b*, 20*c*, and 20*d*), and further an arbitrary one or ones of these PCs is/are represented as a "PC(s) 20".

Also in this embodiment, the user is allowed to use a PC 20 that the user is used to operate, instead of a terminal 10, to perform operation or input. For example, there may be a case in which a user is not used to perform operation or input with the operation keys 108 of a terminal 10, or the case in which a user who is currently using a PC 20 is unable to immediately know that there has been the above-described deletion request. Specifically, in this embodiment, the transmission terminal management system 80 performs processing to convey to the transmission management system 50 various requests or the like from a PC 20 by exchanging information with the PC 20.

Since a PC 20 and the transmission terminal management system 80 of the embodiment each have the same appearance as that of a general server computer, descriptions of the appearances thereof are omitted. Further, since a PC 20 and the transmission terminal management system 80 each have a hardware configuration that is the same as or similar to that of the above-described transmission management system 50, descriptions thereof are omitted. Note that a management system 3A of the embodiment is configured by the transmission management system 50 and the transmission terminal management system 80.

<<Functional Configuration of System>>

Figure 17:
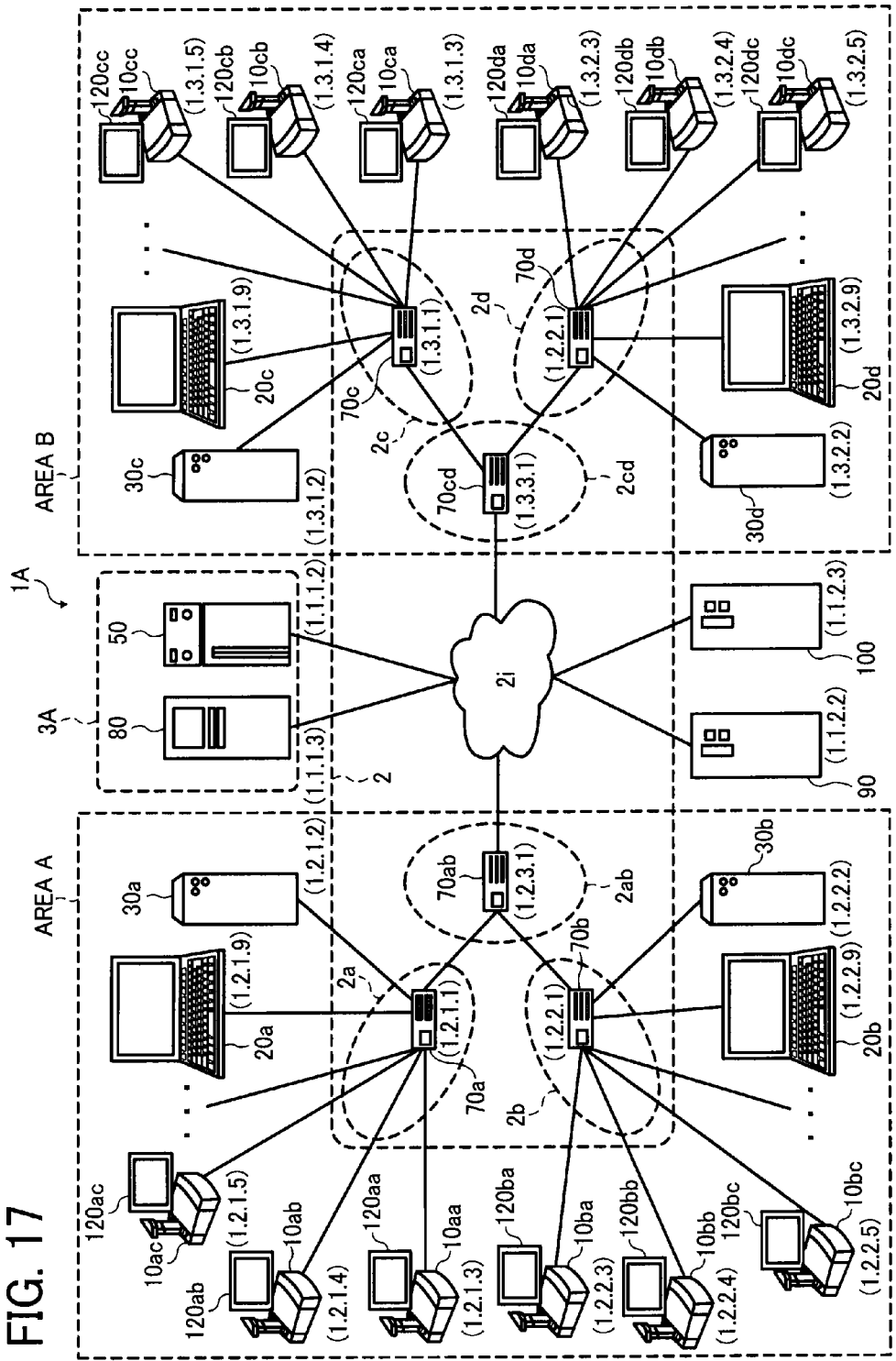
FIG. 17 is a schematic diagram of a transmission system according to an embodiment of the present invention.
Figure 18:
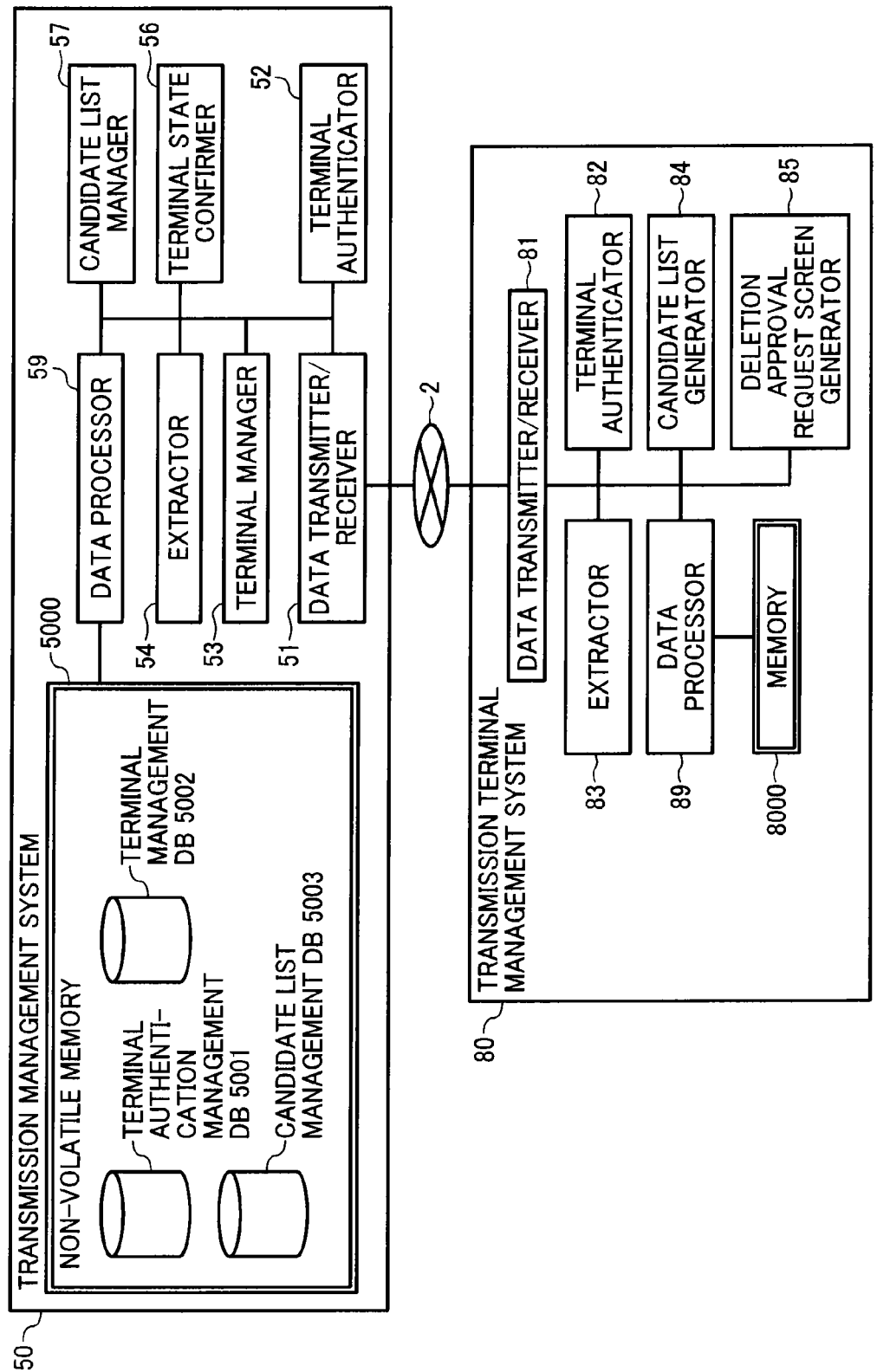
FIG. 18 is a functional block diagram of a transmission management system and a transmission terminal management system included in the transmission system of FIG. 17.

Next, the functional configuration of the system 1A will be described. FIG. 18 is a functional block diagram of the transmission management system 50 and the transmission terminal management system 80 included in the transmission system 1A of the embodiment. In FIG. 18, the transmission management system 50 and the transmission terminal management system 80 are connected to be capable of communicating data via the communication network 2. Also, since the PCs 20 illustrated in FIG. 17 are general PCs, they are omitted in FIG. 18.

<Functional Configuration of Transmission Terminal Management System>

The transmission terminal management system 80 includes a data transmitter/receiver 81, a terminal authenticator 82, an extractor 83, a candidate list generator 84, a deletion approval request screen generator 85, and a data processor 89. These elements are functions that are realized by or that are caused to function by operating any of the elements illustrated in FIG. 6 in response to a command from the CPU 201 in accordance with a transmission terminal management system program expanded from the HD 204 to the RAM 203.

In addition, the transmission terminal management system 80 includes a memory 8000 configured by the RAM 203 or the HD 204 illustrated in FIG. 6.

(Functional Configuration of Transmission Terminal Management System)

Next, each functional configuration of the transmission terminal management system 80 will be described in more details. Note that, in the following description of each functional configuration of the transmission terminal management system 80, among elements illustrated in FIG. 6, relationships with main elements for realizing functional configuration of the transmission terminal management system 80 will also be described.

The data transmitter/receiver 81 is realized by a command from the CPU 201 illustrated in FIG. 6 and by the network I/F 209 illustrated in FIG. 6, and performs transmission/reception of various types of data (or information) to/from another terminal, apparatus, or system via the communication network 2. In addition, the data transmitter/receiver 81 also has a web server function and a data processing function, which will be described later.

The terminal authenticator 82 is realized by a command from the CPU 201 illustrated in FIG. 6, accesses the transmission management system 50, and searches the terminal authentication management DB 5001 (see FIG. 8) configured in the non-volatile memory 5000, thereby authenticating whether a terminal 10 of the user of a PC 20 is a legitimate terminal in this transmission system by determining whether the same pair of a terminal ID and a password as that of a request sender terminal is managed.

The extractor 83 is realized by a command from the CPU 201 illustrated in FIG. 6, searches the candidate list management DB 5003 (see FIG. 10) configured in the non-volatile memory 5000 in the transmission management system 50 by using the terminal ID of the request sender terminal as a search key, thereby extracting the terminal ID of a corresponding counterpart terminal.

The candidate list generator 84 is realized by a command from the CPU 201 illustrated in FIG. 6, and generates the HyperText Markup Language (HTML) of a candidate list illustrated in FIG. 20, which will be described later.

The deletion approval request screen generator 85 generates the HTML of a deletion approval request screen on the basis of the terminal ID of the request sender terminal, which is extracted by the extractor 83.

<<Process or Operation>>

Next, using FIGS. 19 to 24, example operation of managing candidate counterpart terminal information will be described. In the embodiment, it is assumed that the PC 20a, operated by user a of a request sender terminal (terminal 10aa) sends a candidate list deletion approval request to a request destination terminal (terminal 10dc) via the transmission terminal management system 80.

Figure 19:
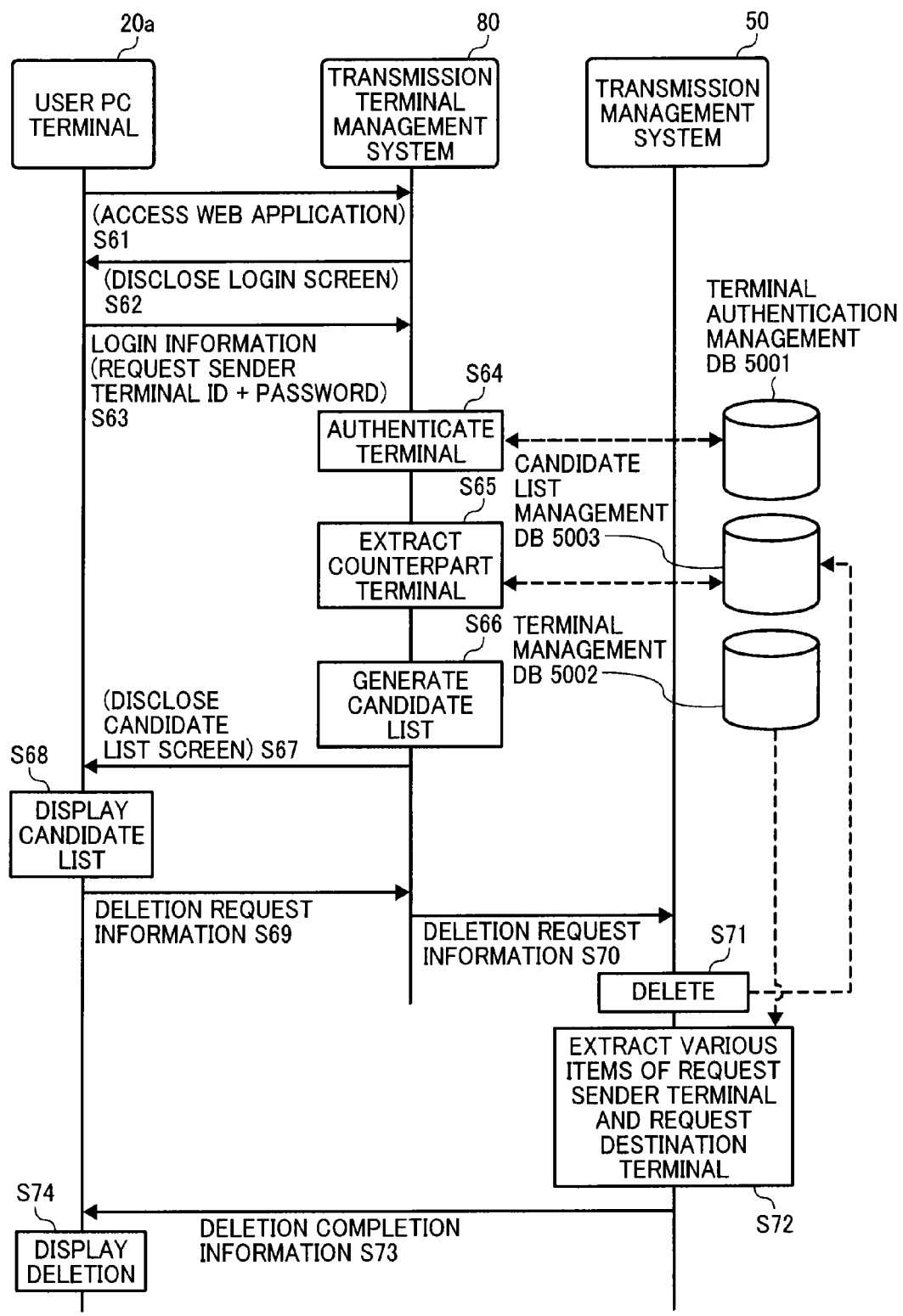
FIG. 19 is a data sequence diagram illustrating operation of sending a deletion request from a user personal computer (PC) terminal.
Figure 21:
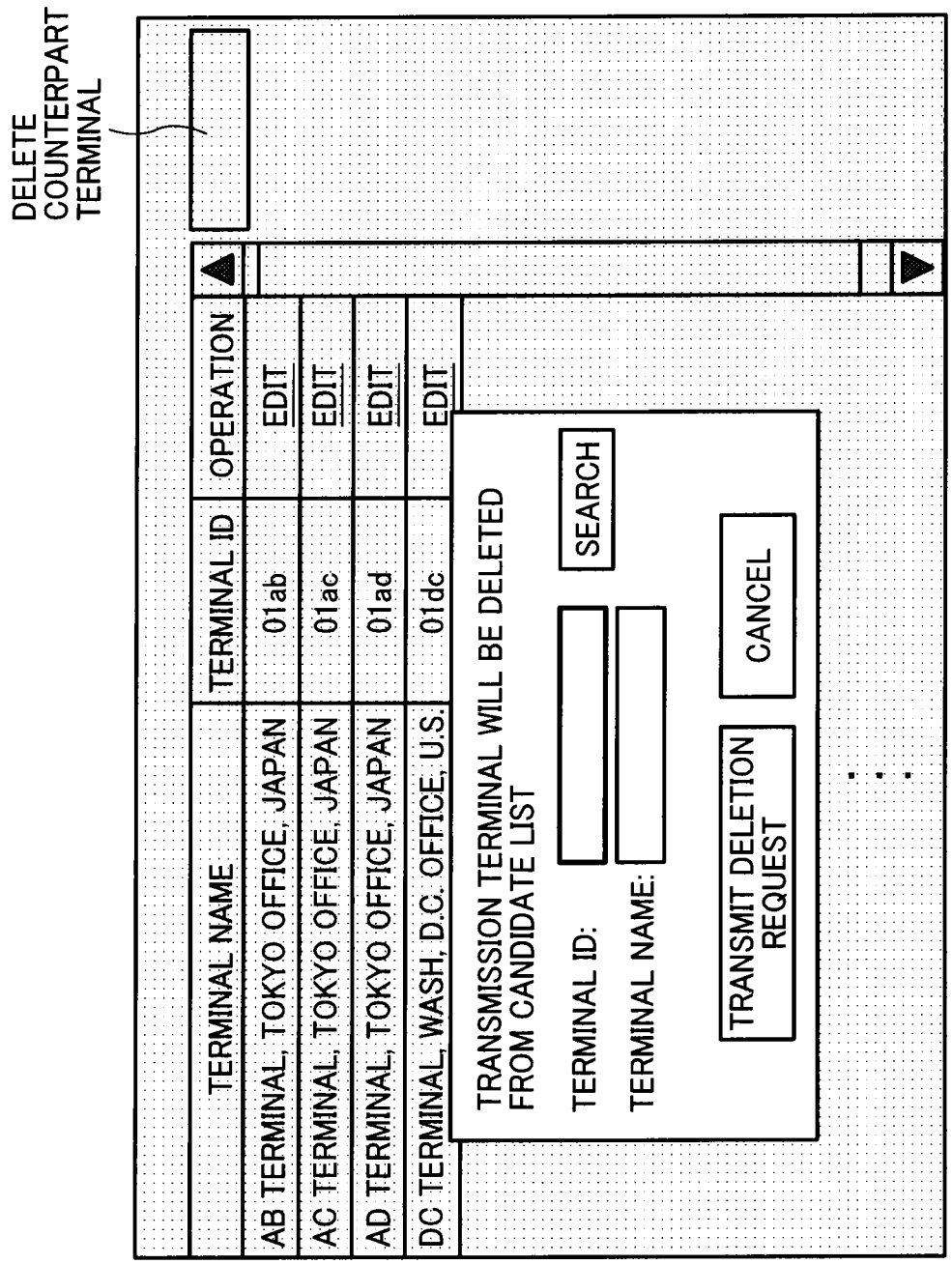
FIG. 21 is a conceptual diagram illustrating an example deletion request acceptance screen.

Note that FIG. 19 is a sequence diagram of operation of sending a deletion request from a user PC. FIG. 20 is a conceptual diagram illustrating a candidate list. FIG. 21 is a conceptual diagram illustrating a deletion request acceptance screen.

As illustrated in FIG. 19, first, the user a of the PC 20a inputs a uniform resource locator (URL) from a web browser on the PC 20a, thereby accessing a web application provided by the transmission terminal management system 80 (step S61). Accordingly, the web server function of the data transmitter/receiver 81 of the transmission terminal management system 80 sends a login screen to the PC 20a, thereby prompting the user a to input the terminal ID and password of the request sender terminal (terminal 10aa) (step S62). When the user a inputs the terminal ID and password of the request sender terminal (terminal 10aa) in response to this, the PC 20a transmits login information including the terminal ID and password of the request sender terminal to the transmission terminal management system 80 (step S63).

Next, the terminal authenticator 82 of the transmission terminal management system 80 accesses the transmission management system 50 and searches the terminal authentication management DB 5001 (see FIG. 8) configured in the non-volatile memory 5000, thereby authenticating whether the terminal 10aa of the user a of the PC 20a is a legitimate terminal in this transmission system 1A by determining whether the same pair of a terminal ID and a password as that of the request sender terminal is managed (step S64). In the case where the terminal 10aa is determined as a legitimate terminal by this authentication, the extractor 83 continuously searches the candidate list management DB 5003 (see FIG. 10) configured in the non-volatile memory 5000 in the transmission management system 50 on the basis of the terminal ID "01aa" of the request sender terminal, thereby extracting the terminal ID of a corresponding counterpart terminal (step S65).

The candidate list generator 84 searches the terminal management DB 5002 (see FIG. 9) on the basis of the terminal ID extracted in step S65 described above, thereby extracting a corresponding terminal name. Using the extracted information, the HTML of the candidate list illustrated in FIG. 20 is generated (step S66). The web server function of the data transmitter/receiver 81 discloses the candidate list to the PC 20a (step S67). Accordingly, the PC 20a displays a candidate list such as that illustrated in FIG. 20 (step S68). FIG. 20 is a conceptual diagram illustrating a candidate list. The candidate list displays the counterpart terminal name of a counterpart terminal, the terminal ID of the counterpart terminal, and an operation region for editing the counterpart terminal name of each counterpart terminal on the candidate list. In addition, a "delete counterpart terminal" key that is pressed by a user in the case of deleting a counterpart terminal is displayed in the upper right-hand corner of the candidate list.

When the user a presses the "delete counterpart terminal" key on the candidate list on the PC 20a, the web browser function of the PC 20a displays a deletion request acceptance screen such as that illustrated in FIG. 21, thereby accepting a deletion approval request (step S68). FIG. 21 is a conceptual diagram illustrating a deletion request acceptance screen. Since the deletion request acceptance screen has the same form as the screen illustrated in FIG. 14, a description thereof is omitted.

Figure 22:
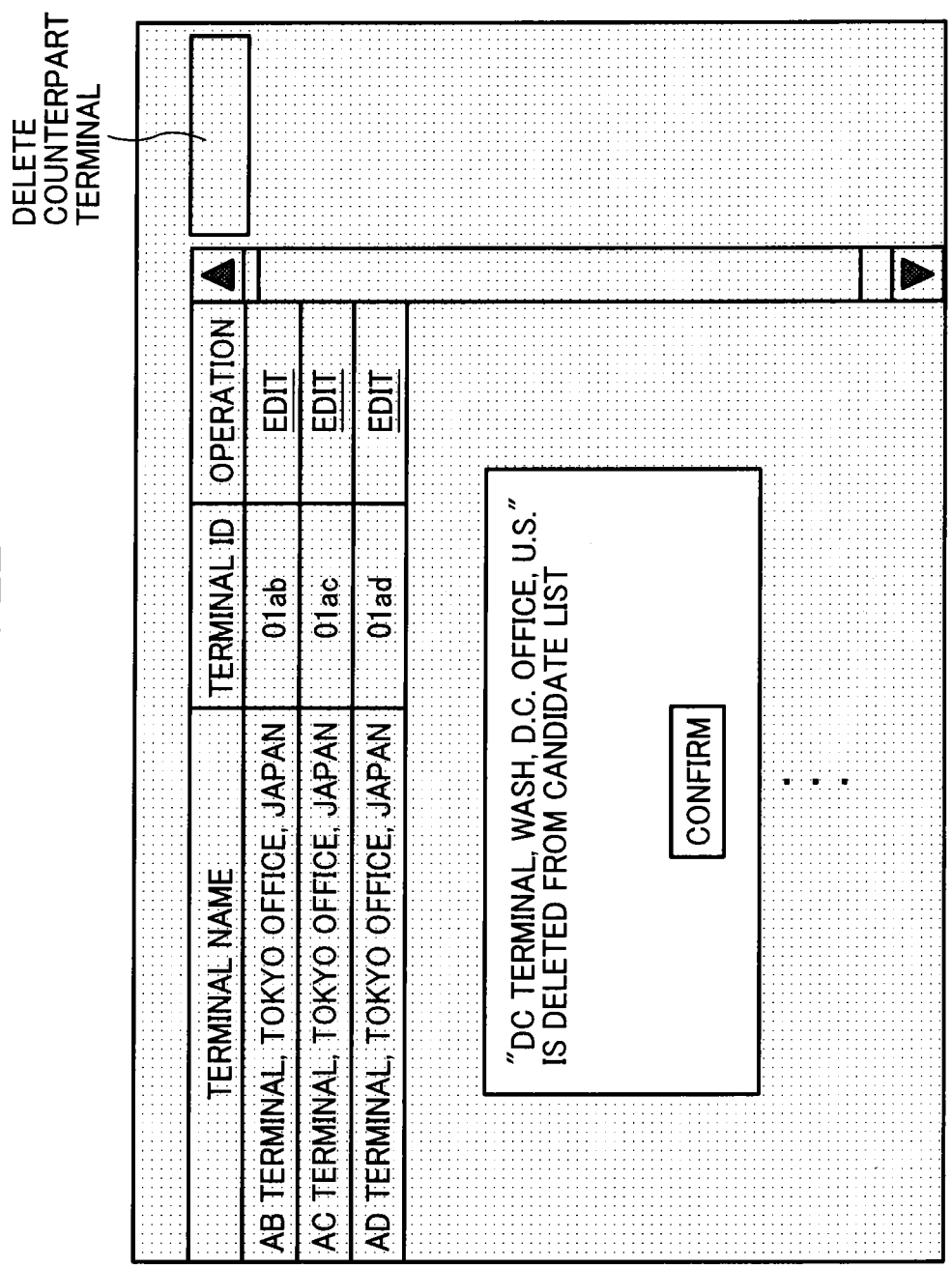
FIG. 22 is a conceptual diagram illustrating an example deletion completion screen.

Next, when the user a inputs the terminal ID or terminal name of a request destination terminal that the user a wants to delete from the candidate list of the user a and presses a "transmit deletion request" key, the PC 20a transmits deletion request information to the transmission terminal management system 80 (step S69). Accordingly, the data processing function of the data transmitter/receiver 81 of the transmission terminal management system 80 analyzes the operation from the user a, and, in place of the terminal 10aa, transmits to the transmission management system 50 deletion request information for deletion from the candidate list (step S70). Since steps S71, S72, S73, and S74 which are processing thereafter are respectively the same as steps S43, S44, S45-1, and S46-1 of FIG. 13, descriptions thereof are omitted. Note that, in step S74, a deletion completion screen such as that illustrated in FIG. 22 is displayed as a pop up. FIG. 22 is a conceptual diagram illustrating a deletion completion screen. Since the deletion completion screen has the same form as the screen illustrated in FIG. 15, a description thereof is omitted.

Next, using FIGS. 23 and 24, the case in which the user d of the request destination terminal 10dc confirms deletion completion by using the PC 20d will be described. Here, the case in which, immediately after the user d activates the PC 20d, the user d confirms deletion completion will be described. Note that this case is only exemplary, and confirmation of deletion completion may be periodically or arbitrarily performed by the user d after the user d activates the PC 20d.

Figure 23:
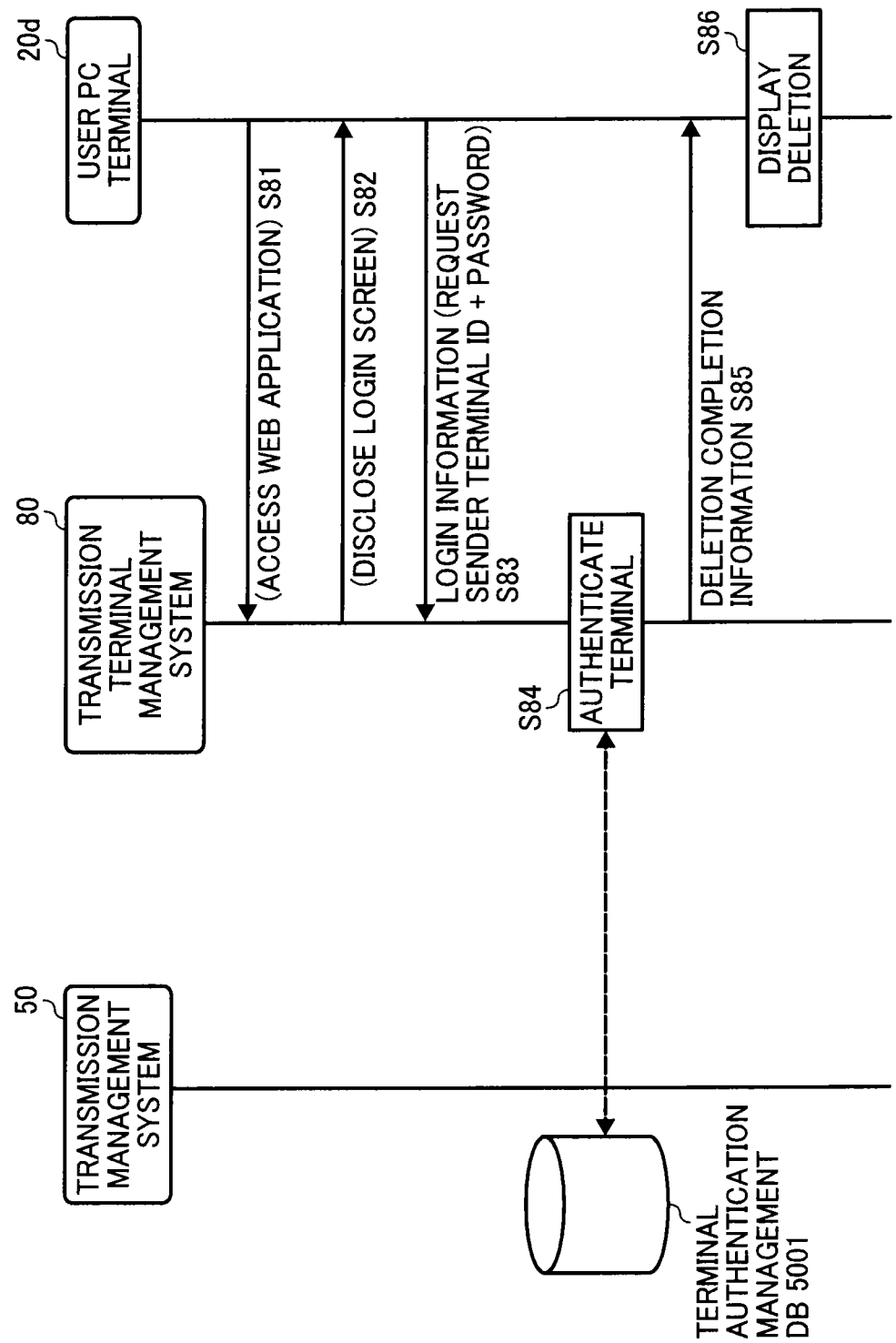
FIG. 23 is a data sequence diagram illustrating operation of confirming deletion completion from a user PC terminal.
Figure 24:
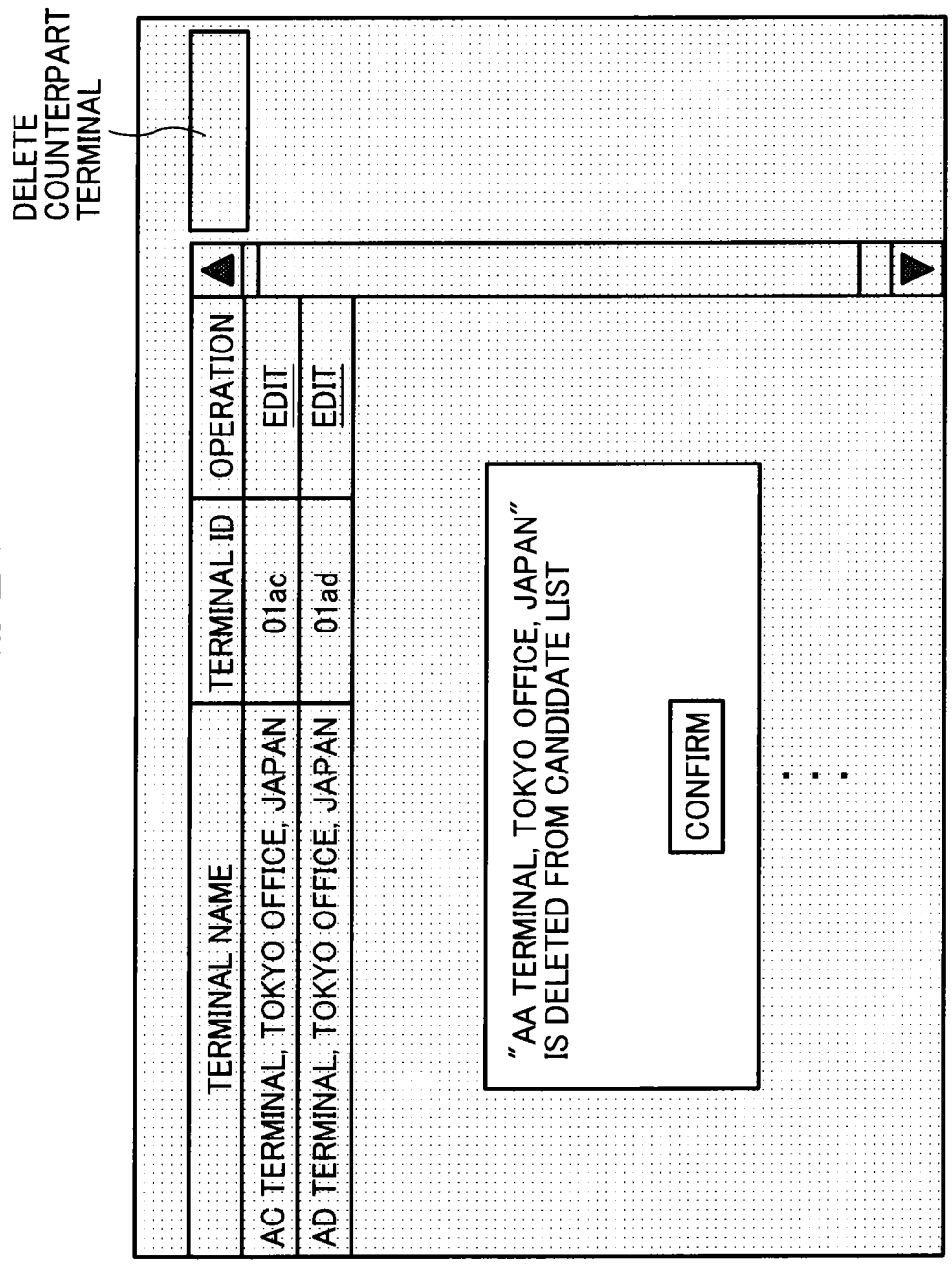
FIG. 24 is a conceptual diagram illustrating an example deletion completion screen.

FIG. 23 is a sequence diagram of confirming deletion completion from a user PC terminal. FIG. 24 is a conceptual diagram illustrating a deletion completion screen. In addition, since steps S81 to S84 in FIG. 23 are the same as steps S61 to S64 described above, descriptions thereof are omitted. Further, since steps S85 and S86 are the same as steps S45-1 and S46-2 described above, descriptions thereof are omitted. Note that, in step S86, as illustrated in FIG. 24, a deletion completion screen such as that illustrated in FIG. 16 is displayed as a pop up on the candidate list. Since the deletion request acceptance screen has the same form as the screen illustrated in FIG. 16, a description thereof is omitted.

According to the embodiment as has been described above, even in the case in which the user d is not used to perform operation or input with the operation keys 108 of the terminal 10dc or the case in which the user d who is currently using the PC 20dc is unable to immediately know that there has been the above-mentioned deletion approval request, the user at the PC 20dc can request to delete a candidate counterpart terminal, or can be notified of deletion of a candidate counterpart terminal.

Note that the relay devices 30, the transmission management system 50, the transmission terminal management system 80, the program providing system 90, and the maintenance system 100 in the above-described embodiments may be configured by a single computer or a plurality of computers to which divided portions (functions) are arbitrarily allocated. In addition, in the case where the program providing system 90 is configured by a single computer, a program transmitted by the program providing system 90 may be separately transmitted in units of a plurality of modules, or may be transmitted in its entirety. Further, in the case where the program providing system 90 is configured by a plurality of computers, a program may be divided into a plurality of modules, and the modules may be individually transmitted from the respective computers.

In addition, a recording medium having recorded thereon the terminal program, relay terminal program, transmission management program, or transmission terminal management program in the above-described embodiments, the HD 204 storing these programs, and the program providing system 90 including the HD 204 are each used in the case where the terminal program, relay terminal program, transmission management program, or transmission terminal management program is provided as a program product to users within a certain country or outside that country. Note that the transmission management system 50 and the transmission terminal management system 80 in the management system 3A may be integrated, instead of separated. In this case, the management system 3A executes a management program. Also in the case of a management program, a recording medium having recorded thereon the management program, the HD 204 storing the management program, and the program providing system 90 including the HD 204 are each provided as a program product to users within a certain country or outside that country.

In addition, although the case of a videoconference system has been described as an example of the transmission system 1 or 1A in the above-described embodiments, the embodiments are not limited to this case, and the transmission system 1 or 1A may be a phone system such as an Internet Protocol (IP) phone system or an Internet phone system. In addition, the transmission system 1 or 1A may be a car navigation system. In this case, for example, one of two terminals 10 corresponds to a car navigation apparatus mounted on a car, and the other terminal 10 corresponds to a management terminal or a management server of a management center that manages car navigation, or a car navigation apparatus mounted on another car.

Further, the transmission system 1 or 1A may be a cellular phone communication system. In this case, for example, the terminals 10 correspond to cellular phones.

In addition, image data serving as sight data and audio data serving as hearing data are described as examples of content data in the above-described embodiments, the content data is not limited to these items of data, and the content data may be other five-sense data. For example, in the case where the content data is touch data, a feeling obtained by a user's contact at one terminal is transmitted to the other terminal side. Further, in the case where the content data is smell data, a smell at one terminal side is transmitted to the other terminal side. In addition, in the case where the content data is taste data, a taste at one terminal side is transmitted to the other terminal side.

Further, the content data may be at least one of image (sight) data, audio (hearing) data, touch data, smell data, and taste data.

In addition, although the case in which a videoconference is held by the transmission system 1 or 1A has been described in the above-described embodiments, the embodiments are not limited to this case. The transmission system 1 or 1A may be used in meetings, general conversation between family members or friends, or one-way presentation of information.

Further, instead of the above-mentioned terminal ID, a user ID for identifying a user may be used. Identification information of a terminal includes not only a terminal ID, but also a user ID.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:
1. A management system, comprising:
 a memory that stores a candidate list for each one of a plurality of transmission terminals, the candidate list associating identification information of one or more candidate counterpart terminals each capable of communicating with the transmission terminal, with identification information of the transmission terminal;
 a receiver that receives, from a first transmission terminal, a deletion request for deleting identification information of a second transmission terminal of the plurality of transmission terminals from the candidate list of the first transmission terminal of the plurality of transmission terminals;

processing circuitry that deletes, in response to the deletion request for deleting identification information of the second transmission terminal received from the first transmission terminal, the identification information of the second transmission terminal from the candidate list of the first transmission terminal and further deletes identification information of the first transmission terminal from a candidate list of the second transmission terminal; and a transmitter that transmits, to the second transmission terminal, a first notification indicating that the identification information of the first transmission terminal has been deleted from the candidate list of the second transmission terminal together with operation state information indicating a current operation state of the first transmission terminal.

2. The management system of claim 1, wherein the receiver receives the identification information of the first transmission terminal, and the identification information of the second transmission terminal, with the deletion request.

3. A transmission system, comprising:
the management system of claim 1; and
the second transmission terminal that displays a screen based on the first notification received from the management system.

4. The management system of claim 1, wherein the processing circuitry deletes the identification information of the first transmission terminal from a candidate list of the second transmission terminal, before receiving confirmation from the second transmission terminal.

5. The management system of claim 1, wherein the processing circuitry controls a display of the second transmission terminal to display a confirmation key together with the first notification indicating deletion of the identification information of the first transmission terminal.

6. The management system of claim 1, wherein the transmitter further transmits, to the first transmission terminal, a second notification indicating deletion of the identification information of the second transmission terminal from the candidate list of the first transmission terminal.

7. A transmission system, comprising:
the management system of claim 6; and
the first transmission terminal that displays a screen based on the second notification received from the management system.

8. The transmission system of claim 7, wherein the management system receives the deletion request directly from the first transmission terminal.

9. The transmission system of claim 7, wherein the management system receives the deletion request from an information processing apparatus, operated by a user of the first transmission terminal.

10. A method of managing information regarding a plurality of transmission terminals, comprising:
storing a candidate list for each one of the plurality of transmission terminals in a memory, the candidate list associating identification information of one or more candidate counterpart terminals each capable of communicating with the transmission terminal, with identification information of the transmission terminal;
receiving, from a first transmission terminal, a deletion request for deleting identification information of a second transmission terminal of the plurality of transmission terminals from the candidate list of the first transmission terminal of the plurality of transmission terminals;

deleting, in response to the deletion request for deleting identification information of the second transmission terminal received from the first transmission terminal, the identification information of the second transmission terminal from the candidate list of the first transmission terminal and identification information of the first transmission terminal from a candidate list of the second transmission terminal; and transmitting, to the second transmission terminal, a first notification indicating that the identification information of the first transmission terminal has been deleted from the candidate list of the second transmission terminal together with operation state information indicating a current operation state of the first transmission terminal.

11. The method of claim 10, wherein the deleting step comprises deleting the identification information of the first transmission terminal from a candidate list of the second transmission terminal, before receiving confirmation from the second transmission terminal.

12. The method of claim 10, further comprising controlling a display of the second transmission terminal to display a confirmation key together with the first notification indicating deletion of the identification information of the first transmission terminal.

13. The method of claim 10, further comprising:
transmitting to the first transmission terminal, a second notification indicating deletion of the identification information of the second transmission terminal from the candidate list of the first transmission terminal.

14. A non-transitory recording medium storing a program which, when executed by one or more processors, causes the one or more processors to perform a method of managing information regarding a plurality of transmission terminals, the method comprising:
storing a candidate list for each one of the plurality of transmission terminals in a memory, the candidate list associating identification information of one or more candidate counterpart terminals each capable of communicating with the transmission terminal, with identification information of the transmission terminal;
receiving, from a first transmission terminal, a deletion request for deleting identification information of a second transmission terminal of the plurality of transmission terminals from the candidate list of the first transmission terminal of the plurality of transmission terminals;
deleting, in response to the deletion request for deleting identification information of the second transmission terminal received from the first transmission terminal, the identification information of the second transmission terminal from the candidate list of the first transmission terminal and identification information of the first transmission terminal from a candidate list of the second transmission terminal; and
transmitting, to the second transmission terminal, a first notification indicating that the identification information of the first transmission terminal has been deleted from the candidate list of the second transmission terminal together with operation state information indicating a current operation state of the first transmission terminal.

15. The recording medium of claim 14, wherein the deleting step comprises deleting the identification information of the first transmission terminal from a candidate list of the second transmission terminal, before receiving confirmation from the second transmission terminal.

16. The recording medium of claim 14, further comprising controlling a display of the second transmission terminal to display a confirmation key together with the first notification indicating deletion of the identification information of the first transmission terminal.

17. The recording medium of claim 14, wherein the method further comprises transmitting to the first transmission terminal, a second notification indicating deletion of the identification information of the second transmission terminal from the candidate list of the first transmission terminal.

* * * * *